(12) United States Patent
Bernstein et al.

(10) Patent No.: US 9,423,253 B2
(45) Date of Patent: Aug. 23, 2016

(54) MEMS HEMISPHERICAL RESONATOR GYROSCOPE

(71) Applicant: The Charles Stark Draper Laboratory, Inc., Cambridge, MA (US)

(72) Inventors: Jonathan Bernstein, Medfield, MA (US); Marc Steven Weinberg, Newtown, MA (US); Murali Chaparala, Needham, MA (US); Peter G. Sherman, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 740 days.

(21) Appl. No.: 13/665,464

(22) Filed: Oct. 31, 2012

(65) Prior Publication Data

US 2013/0104653 A1    May 2, 2013

Related U.S. Application Data

(60) Provisional application No. 61/553,669, filed on Oct. 31, 2011.

(51) Int. Cl.
*G01C 19/56* (2012.01)
*G01C 19/5691* (2012.01)

(52) U.S. Cl.
CPC ......... *G01C 19/5691* (2013.01); *Y10T 29/4913* (2015.01)

(58) Field of Classification Search
CPC .............................. G01C 19/5712; G01C 19/56
USPC ...................................................... 73/504.12
See application file for complete search history.

(56) References Cited

U.S. PATENT DOCUMENTS

| 4,544,576 | A | * | 10/1985 | Chu | ................... | H01L 21/02126 257/E21.243 |
| 5,485,304 | A | * | 1/1996 | Kaeriyama | ........ | G02B 26/0841 359/224.1 |
| 5,528,452 | A | * | 6/1996 | Ko | ......................... | G01L 9/0073 361/283.4 |
| 5,760,304 | A | | 6/1998 | Lynch | | |
| 5,930,632 | A | * | 7/1999 | Gardner | ............ | H01L 21/28097 257/E21.194 |
| 7,518,493 | B2 | * | 4/2009 | Bryzek | ............... | B60C 23/0408 340/442 |

(Continued)

FOREIGN PATENT DOCUMENTS

EP      2463623 A2      6/2012
WO    WO 2009/017623 A1    2/2009

OTHER PUBLICATIONS

International Search Report and Written Opinion issued Jan. 28, 2013 of International Application No. PCT/US2012/062819.

*Primary Examiner* — Hezron E Williams
*Assistant Examiner* — Mark A Shabman
(74) *Attorney, Agent, or Firm* — Edward A. Gordon; Paul S. Hunter; Foley & Lardner LLP

(57) ABSTRACT

A MEMS gyroscope is provided. A substrate can be formed with a substantially planar surface, a substantially hemispherical cavity extending into the surface, an actuation electrode, and a plurality of sensing electrodes. A resonator formed from a substantially hemispherical shell can be suspended within the cavity by a stem coupling the center of the bottom of the cavity to the center of the bottom of the shell. An electronic processor can be configured to cause a voltage to be applied to the actuation electrode, receive signals from the sensing electrodes, and process the received signals to determine rotation of the MEMS gyroscope.

29 Claims, 29 Drawing Sheets

(56) References Cited

U.S. PATENT DOCUMENTS

| | | | |
|---|---|---|---|
| 9,188,442 B2* | 11/2015 | Painter | G01C 19/5691 |
| 2009/0031831 A1* | 2/2009 | Stewart | G01C 19/5691 |
| | | | 74/5.6 D |
| 2010/0083758 A1 | 4/2010 | Vandebeuque | |
| 2011/0226058 A1* | 9/2011 | Yoneda | G01C 19/5755 |
| | | | 735/504.12 |
| 2011/0239763 A1 | 10/2011 | Shkel | |
| 2012/0144917 A1* | 6/2012 | Painter | G01C 19/5691 |
| | | | 73/504.13 |

* cited by examiner

MEMS HEMISPHERICAL RESONATOR GYROSCOPE

CROSS-REFERENCE TO RELATED APPLICATIONS

This application claims the benefit of and priority to U.S. Provisional Patent Application No. 61/553,669, filed Oct. 31, 2011, the disclosure of which is hereby incorporated herein by reference in its entirety.

STATEMENT OF GOVERNMENT LICENSE RIGHTS

This invention was made with Government support under HR0011-11-C-0045 awarded by the Defense Advanced Research Projects Agency. The Government has certain rights in this invention.

BACKGROUND

Guidance and navigation systems can be used in a wide range of applications, including personal navigation, military applications, rollover protection for cars, and computer gaming. There are many techniques for designing gyroscopes for use in various applications, such as tuning fork gyroscopes, Foucault pendulum gyroscopes, and fiber optic gyroscopes. However, these gyroscopes are associated with a number of disadvantages, such as a relatively low degree of rotational symmetry and bulky components that can reduce portability. It is therefore desirable to develop gyroscope designs and manufacturing processes that enable production of gyroscopes with very small feature sizes, while maintaining accuracy and precision of the gyroscopes.

SUMMARY OF THE INVENTION

Aspects and implementations of the present disclosure are directed to a MEMS hemispherical resonator gyroscope.

At least one aspect is directed to a MEMS hemispherical resonator gyroscope. The gyroscope can include a substrate having a substantially planar surface, a substantially hemispherical cavity extending into the surface, an actuation electrode, and a plurality of sensing electrodes. The gyroscope can include a resonator formed from a substantially hemispherical shell suspended within the cavity by a stem coupling the center of the bottom of the cavity to the center of the bottom of the shell. The gyroscope can include an electronic processor configured to, cause a voltage to be applied to the actuation electrode, receive signals from the sensing electrodes, and process the received signals to determine rotation of the MEMS gyroscope.

In some implementations, the resonator includes a lip extending radially outwards around an edge of the hemispherical shell. In some implementations, the resonator comprises an electrically conductive material, such as boron doped diamond, doped silicon carbide, doped silicon.

In some implementations, the actuation and sensing electrodes are positioned on the surface of the substrate beneath the resonator. In some implementations, the actuation and sensing electrodes are positioned such that a first portion of each electrode is located on the surface of the substrate beneath the lip of the resonator and a second portion of each electrode extends downward on the surface of the hemispherical cavity. In some implementations, the actuation and sensing electrodes are positioned on the top surface of the substrate surrounding the lip of the resonator. In some implementations, the actuation and sensing electrodes surround the hemispherical cavity and the number of electrodes is a multiple of eight. In some implementations, the actuation and sensing electrodes are made from a silicide including at least one of chromium, zirconium, platinum, palladium, nickel, cobalt, iron, iridium, rhodium, hafnium, vanadium and ruthenium. In other implementations, the actuation and sensing electrodes include dual metal stacks made from chromium or zirconium and at least one of platinum, palladium, nickel, cobalt, iron, iridium, rhodium, hafnium, vanadium and ruthenium. In some implementations, the electrodes are formed from a dual layer of zirconium.

In some implementations, the resonator is made from a dielectric material. In some implementations, the dielectric material is diamond, $SiO_2$, $Si_3N_4$, or $SiO_2$—$TiO_2$.

In some implementations, the actuation electrodes include interdigitated electrode pairs located on the surface of the substrate beneath the lip of the resonator such that a voltage applied to the electrodes creates fringing fields that cause the resonator to vibrate. In some implementations, the substrate is made from an amorphous material. In some implementations, the amorphous material is selected such that the coefficient of thermal expansion of the substrate matches the coefficient of thermal expansion of the resonator. For example, the amorphous material can include CORNING 1715 glass. The coefficients of thermal expansion of the resonator and the substrate can both be in the range of about 2 to about 4 parts per million per degree Celsius.

In some implementations, the lip of the resonator is segmented into tabs extending radially outward from the edge of the resonator. The total number of tabs can be a multiple of eight. A metal can be deposited onto the tabs, wherein a mass of the metal differs on at least two of the tabs. The metal can include an adhesion layer of chromium, zirconium or titanium and at least one of gold and copper.

In some implementations, the resonator has a first resonant frequency associated with a first vibratory mode and a second resonant frequency associated with a second vibratory mode, and the mass of metal on each tab is selected to increase a degree of matching between the first resonant frequency and the second resonant frequency. In some implementations, the stem extends into the substrate below the bottom of the cavity. The stem can be hollow.

In some implementations, the gyroscope includes a thin film battery located on the substrate and coupled to the electronic processor. In some implementations, at least one resistor can be located between at least one of the electrodes and electrical or virtual ground or a drive circuit. In some implementations, the resonator has a first Q value associated with a first vibratory mode and a second Q value associated with a second vibratory mode, and a value of the at least one resistor is selected to increase a degree of matching between the first Q value and the second Q value.

In some implementations, the resonator includes a corrugated region at its center. The resonator can have a thickness in the range of about 0.5 microns to about 20 microns. The resonator can have a diameter in the range of about 0.2 mm to about 10 mm.

At least one aspect is directed to a method for manufacturing a MEMS hemispherical resonator gyroscope. The method can include the step of patterning a hemispherical cavity into a surface of a substrate layer. The method can include the step of depositing a sacrificial layer on top of the conductive layer. The method can include the step of patterning the sacrificial layer to provide a central base for a substantially hemispherical resonator. The method can include the step of depositing a resonator layer on top of the sacrificial layer. The method can include the step of patterning the resonator layer to form the substantially hemispherical resonator and electrodes. The method can include the step of removing the sacrificial layer from beneath the resonator.

In some implementations, patterning the resonator layer includes patterning a continuous actuation electrode to surround an edge of the resonator. Patterning the resonator layer can also include patterning a lip coupled to and surrounding an edge of the resonator. Patterning the resonator layer can also include patterning tabs extending radially outward from the lip.

In some implementations, the method can include depositing a metal onto each of the tabs and selectively removing portions of the metal such that a mass of the metal differs on at least two tabs. Depositing the metal onto each of the tabs can include depositing gold.

In some implementations, the method can include patterning a plurality of channels into a bottom portion of the hemispherical cavity or the sacrificial layer. Depositing the resonator layer can include partially filling the channels, resulting in corrugations at a base of the hemispherical resonator.

In some implementations, the method can include placing resistors between at least one of the electrodes and electrical or virtual ground or a drive circuit. A value of at least one resistor can be selected to increase a degree of Q matching between at least two vibratory modes of the resonator. In some implementations, the method can include depositing metal bond pads onto the electrodes.

At least one aspect is directed to a method for manufacturing a MEMS hemispherical resonator gyroscope. The method can include the step of patterning a hemispherical cavity into a surface of a substrate layer. The method can include the step of depositing a conductive layer on top of the surface. The method can include the step of patterning the conductive layer. The method can include the step of depositing a sacrificial layer on top of the conductive layer. The method can include the step of patterning the sacrificial layer to provide a central base for a substantially hemispherical resonator. The method can include the step of depositing a resonator layer on top of the sacrificial layer. The method can include the step of patterning the resonator layer to form the substantially hemispherical resonator and electrodes. The method can include the step of removing the sacrificial layer from beneath the resonator.

In some implementations, patterning the resonator layer can include patterning a continuous actuation electrode to surround an edge of the resonator. Patterning the resonator layer can also include patterning a lip coupled to and surrounding an edge of the resonator.

The method can also include patterning tabs extending radially outward from the lip. A metal can be deposited onto each of the tabs. A mass of the metal can differ on at least two tabs. Depositing the metal onto each of the tabs can include depositing gold.

In some implementations, the method includes patterning a plurality of channels into a bottom portion of the hemispherical cavity or the sacrificial layer. In some implementations, depositing the resonator layer comprises partially filling the channels, resulting in corrugations at a base of the hemispherical resonator.

In some implementations, the method includes placing resistors between at least one of the electrodes and electrical or virtual ground or a drive circuit. A value of at least one resistor can be selected to increase a degree of Q matching between at least two vibratory modes of the resonator. The method can also include depositing metal bond pads onto the electrodes.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DESCRIPTION OF CERTAIN ILLUSTRATIVE IMPLEMENTATIONS

Following below are more detailed descriptions of various concepts related to, and implementations of, MEMS hemispherical resonator gyroscopes and methods for their manufacture. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
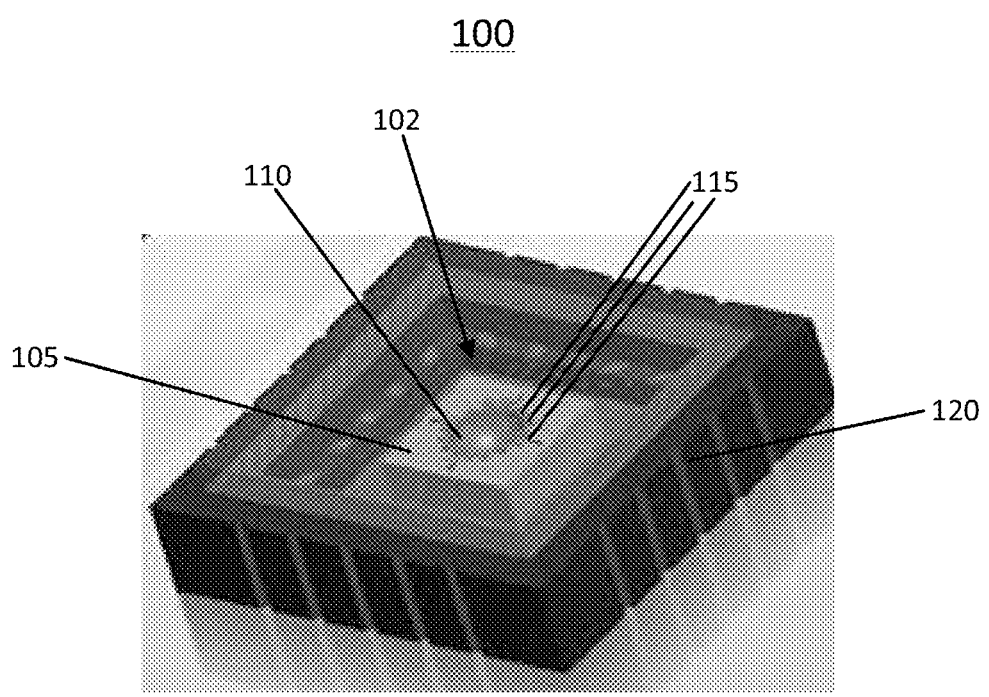
FIG. 1 is a depiction of a MEMS gyroscope system, according to an illustrative implementation.

FIG. 1 is a depiction of a MEMS gyroscope system 100, according to an illustrative implementation. The system 100 includes a gyroscope 102 consisting of a substrate 105, a resonator 110, and a plurality of electrodes 115, and is enclosed by a housing 120. The gyroscope 100 can also include an electronic processor and a power source, such as a thin film battery. The gyroscope 100 can be used in rate integrating (i.e., whole-angle) mode or rate mode.

The substrate 105 is a mass of material having a horizontally planar top surface into a which a substantially hemispherical cavity has been formed. In some implementations, the substrate is made from an amorphous material such as glass. The amorphous nature of the substrate allows features of the gyroscope 100 to be formed precisely in the substrate 105 through processes such as chemical etching, and can help to reduce the imprecision associated with etching a crystalline material. The material used to form the substrate 105 can have a coefficient of thermal expansion that is substantially the same as the coefficient of thermal expansion of the resonator 110. For example, the substrate 105 can include glass such as CORNING 1715 glass manufactured by Corning Incorporated of Corning, N.Y. The substrate 105 can be also formed from any amorphous material having an annealing temperature in the range of about 750 degrees Celsius to about 1000 degrees Celsius and an average coefficient of thermal expansion in the range of about 2 ppm/K to about 4 ppm/K at temperatures from about 20 degrees Celsius to about 800 degrees Celsius. In some implementations, the substrate 105 can be formed from silica, silicon, Pyrex, or Schott Borofloat.

The gyroscope 100 also includes a resonator 110. The resonator 110 is substantially hemispherical in shape and is suspended within the hemispherical cavity in the substrate 105. The center of the bottom of the resonator 110 is coupled to the center of the bottom of the cavity in the substrate 105 by a stem, which is not visible in FIG. 1. In some implementations, the stem couples to the surface of the substrate 105. Alternatively, the stem can extend into the substrate 105 below the bottom of the cavity. The stem can be formed from the same piece of material as the resonator 110, or the stem may be a separate material attached to the resonator 110 by an adhesive or a mechanical joining process. In some implementations, the stem is hollow. A top edge of the resonator 110 extends above the top surface of the substrate 105. The sides of the resonator 110 are separated from the sides of the cavity in the substrate 105 in order to allow the resonator to vibrate freely within the cavity, anchored only by its stem. In some implementations, the diameter of the resonator 110 is in the range of about 0.2 mm to about 10 mm. The depth of the resonator 110 is in the range of about 0.1 mm to about 2.5 mm. The depth of the substrate 105 is larger than the depth of the resonator 110 (e.g., in the range of about 0.12 mm to about 6 mm, depending on the size of the resonator 110) and has a length and width larger the diameter of the resonator 110. For example, the substrate 105 can have a length and width in the range of about 0.3 mm to about 6 mm. The length and width of the substrate 105 can be selected to leave room on its top surface for actuation and sensing electrodes 115, interconnect wiring, and bond pads.

In some implementations, the resonator 110 can be made from an electrically insulating material. For example, the resonator 110 can be made from a diamond layer created by plasma enhanced chemical vapor deposition or by hot filament chemical vapor deposition. The width of the resonator can be in the range of about 0.5 microns to about 5.0 microns. Alternatively, the resonator 110 can be made from insulating materials such as silicon dioxide, silicon nitride, or an ultra-low expansion glass material. In other implementations, the resonator 110 can be made from a conducting material, such as boron doped diamond, doped silicon, polycrystalline silicon, silicon carbide, Invar, or other metal alloys.

A plurality of electrodes 115 are located on the top surface of the substrate 105. The electrodes 115 are placed symmetrically around the perimeter of the cavity in the substrate 105. In some implementations, the number of electrodes 115 in the gyroscope 100 is a multiple of eight. The electrodes 115 can be formed by depositing an electrically conductive material onto the surface of the substrate 105. Vibration of the resonator 110 can be achieved by applying a voltage to a subset of the electrodes 115, called actuation electrodes. Vibration of the resonator can be sensed by another subset of the electrodes 115, called sense electrodes. In some implementations, an electrode 115 can be both an actuation electrode and a sense electrode. For example, the electrodes 115 can be electrically switched from drive to sense mode by connecting to either a sense amplifier or a drive circuit. The electrodes 115 can be formed from silicide. For example, the electrodes 115 can be formed from silicon and chromium, platinum, palladium, nickel, cobalt, iron, iridium, rhodium, ruthenium, or zirconium. In another implementation, the electrodes 115 are dual metal stacks formed from an adhesion layer such as chromium or zirconium, and platinum, palladium, nickel, cobalt, iron, iridium, rhodium, hafnium, vanadium, or ruthenium. In some implementations, both the adhesion layer and the metal layer of the dual layer stack can be made from zirconium. The electrodes 115 can be formed from the resonator material itself if the resonator is made from a conductive material, such as doped diamond or doped SiC. The angular extent of the electrodes is such that the electrodes 115 fill between about 30% and about 95% of the perimeter of the resonator 110. Each electrode 115 can be connected to a bond pad for connection to an external drive or sense circuit, as discussed below in connection with FIG. 2A.

The gyroscope 100 also includes a housing 120. The housing 120 surrounds the other components of the gyroscope 100 to provide protection from the outside environment. In some implementations, the housing 120 can include a top cover, which is not shown in FIG. 1. In some implementations, electrical inputs and outputs (e.g., connections to the electrodes 115) can be accessed from outside of the housing. The housing 120 can be made from a durable material such as ceramic, plastic or metal, and can include mounting features configured to allow the housing 120 to be mounted onto a separate device.

Figure 2A:
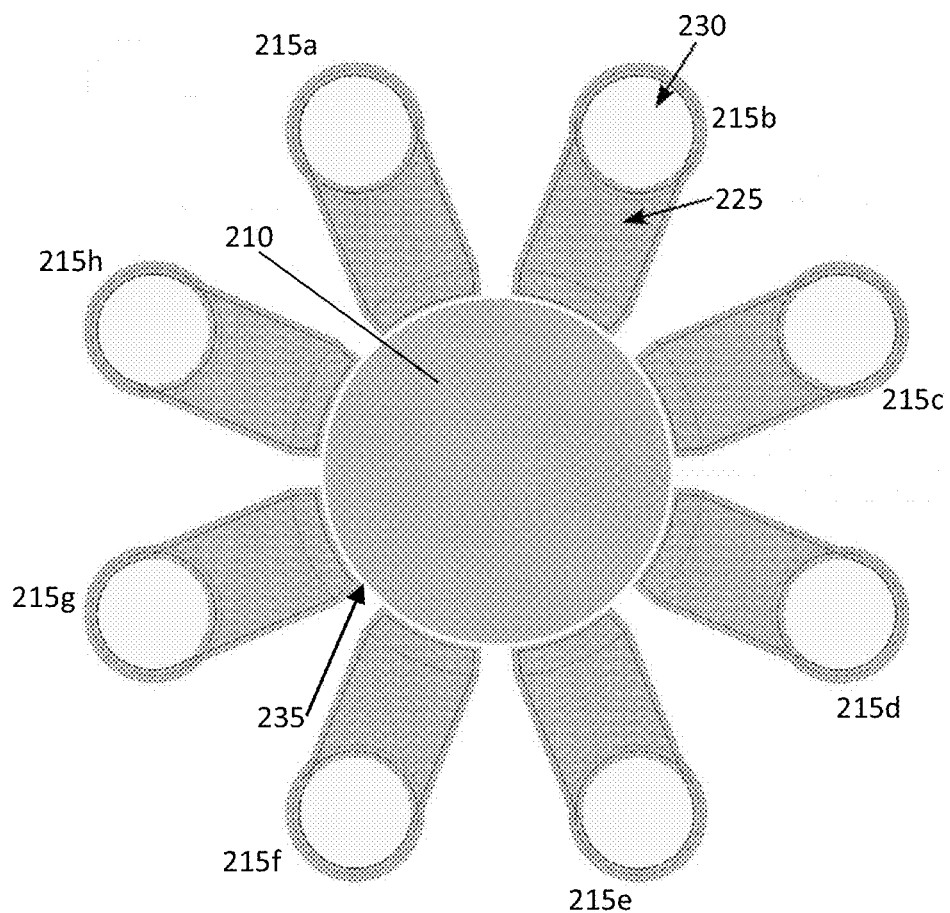
FIG. 2A is a top view of an implementation of a MEMS gyroscope for use in the system of FIG. 1 having a conductive resonator, according to an illustrative implementation.

FIGS. 2A-2D depict various implementations of the gyroscope of FIG. 1, in which the resonator is made from a conductive material. FIG. 2A is a top view of an implementation 201 of a MEMS gyroscope for use in the system of FIG. 1 having a conductive resonator, according to an illustrative implementation. Eight electrodes 215a-215h are placed on the surface of the substrate 205. Each electrode 215 includes an anchor region 225 and a bond pad 230. The electrodes 215 are positioned symmetrically around the cavity in which the resonator 210 is suspended. The electrodes 215 are separated from the resonator 210 by a narrow gap 235.

In some implementations, the electrodes 215 can be actuation electrodes used to cause the resonator 210 to vibrate in a first vibrational mode. As discussed above, the electrodes 215 and the resonator 210 are electrically conductive and separated by the gap 235. An electrode 215 and the resonator 210 can therefore act as a capacitor. A first vibrational mode of the resonator 210 can be induced, for example, by applying a time-varying voltage to electrodes 215a, 215c, 215e, and 215g.

For example, voltage applied simultaneously to electrodes 215a and 215e can cause the edges of the resonator 210 nearest to the electrodes 215a and 215e to deform outwards towards the electrodes 215a and 215e under a force induced by the electric fields between the electrodes 215a and 215e and the resonator 210. At the same time, this deformation of the resonator 210 will cause the edges of the resonator 210 nearest to the electrodes 215c and 215g to deform inwards towards the center of the resonator 210, such that the edge of the resonator takes on an elliptical shape. This is the first quarter of a vibrational period for the resonator 210. In the second quarter, the voltage applied to the electrodes 215a and 215e can be set to zero, removing the electric fields between the electrodes 215a and 215e and the resonator 210. The mechanical forces within the resonator 210 itself will cause the resonator 210 to return to its original position. In the third quarter of the vibrational period, the resonator 210 will again deform into an elliptical shape, but with the edges near electrodes 215c and 215g displaced away from the center of the resonator 210 and the edges near electrodes 215a and 215e displaced toward the center of the resonator 210. Finally, in the fourth quarter of the vibrational period, the edge of the resonator 210 will again return to a its original circular shape. Controlled voltages applied to electrodes 215a, 215c, 215e, and 215g can cause the resonator 210 to vibrate in this first mode indefinitely. The amplitude of vibration at the antinodes (i.e., points nearest electrodes 215a, 215c, 215e, and 215g) is proportional to the voltage applied to the electrodes 215. In some implementations, the amplitude of vibration is in the range of about 0.1 microns to about 10 microns. The resonant frequency of the resonant mode can be in the range of about 2 kHz to about 300 kHz. In this first vibrational mode, the points on the edge of the resonator 210 nearest to the electrodes 215b, 215d, 215f, and 215h are vibrational nodes whose position remains fixed even as the resonator 210 vibrates in the first vibrational mode, such that the capacitance between the electrodes 215b, 215d, 215f, and 215h and the resonator 210 is constant.

The electrodes 215 can also be used as sense electrodes to detect rotation of the resonator 210. As discussed above, when the resonator 210 is vibrating in the first vibrational mode, the vibrational nodes are motionless. However, if the resonator 210 is rotated while vibrating (i.e., if the entire device 100 rotates), the rotation will result in Coriolis forces that cause the vibrational nodes and antinodes of the resonator 210 to change location. The nodes and antinodes will rotate around the edge of the resonator 210 at an angle proportional to the angle of rotation of the resonator 210 itself. As the nodes rotate, the electrodes 215b, 215d, 215f, and 215h will no longer be aligned with the nodes. The points on the edge of the resonator 210 aligned with these electrodes will therefore begin to experience displacement, which will cause a change in the capacitance between the electrodes 215b, 215d, 215f, and 215h and the resonator 210. Thus, in some implementations, the electrodes 215b, 215d, 215f, and 215h can be used to detect this change in capacitance, thereby determining the rotation of the resonator 210.

Figure 2B:
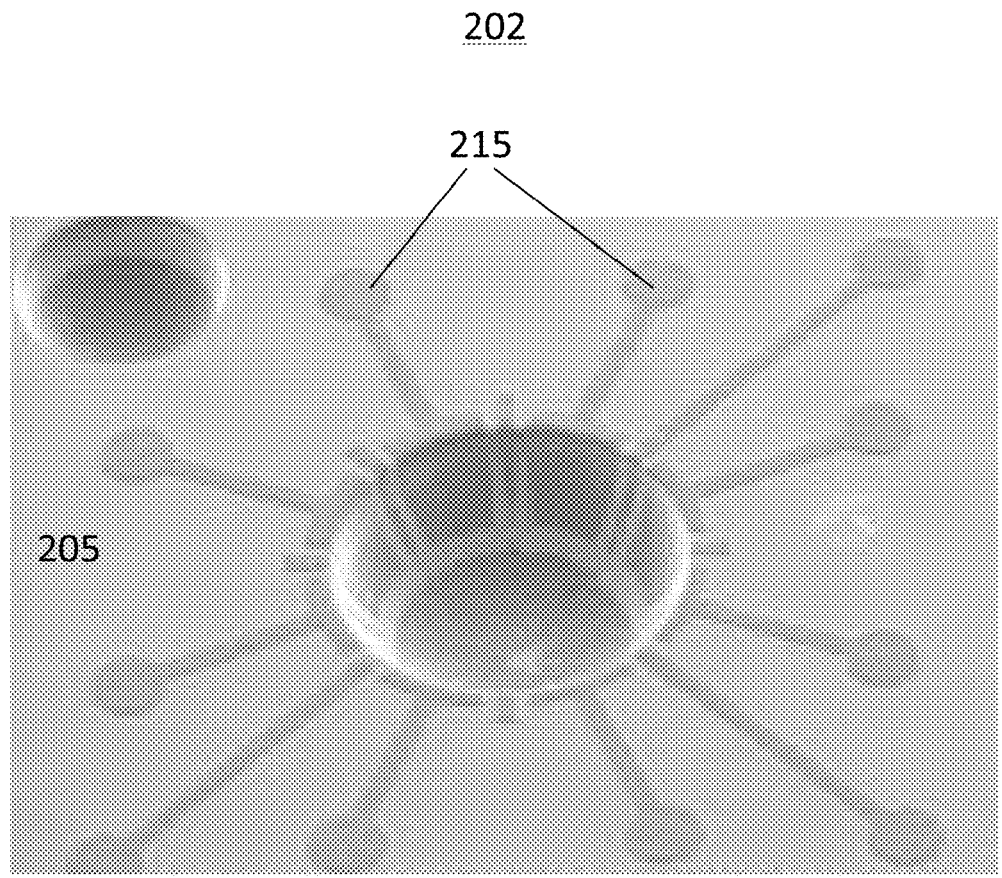
FIG. 2B is a perspective view of a portion of an implementation of a MEMS gyroscope for use in the system of FIG. 1 having a conductive resonator, according to an illustrative implementation.

FIG. 2B is a perspective view of a portion of an implementation 202 of a MEMS gyroscope for use in the system of FIG. 1 having a conductive resonator. The resonator has been removed and is not visible in FIG. 2B. As discussed above, the substrate 205 includes a hemispherical cavity. The surface of the substrate 210 also includes a plurality of electrodes 215 surrounding the cavity. In the implementation shown in FIG. 2B, a portion of the electrodes 215 extends downward from the surface of the substrate 205 along the wall of the cavity, while another portion of each electrode 215 is located on the surface of the substrate 205. The resonator can be formed from a conductive material and can be actuated by the electrodes 215 in the manner discussed above in connection with FIG. 2A. In some implementations, the resonator can include a lip extending outwards from an edge of the resonator and elevated above the surface of the substrate, such that the portion of the electrodes 215 on the surface of the substrate 205 can be located beneath the lip of the resonator. In other implementations, the electrodes 215 reside only on the surface of substrate 205 and do not extend into the hemispherical cavity.

Figure 2C:
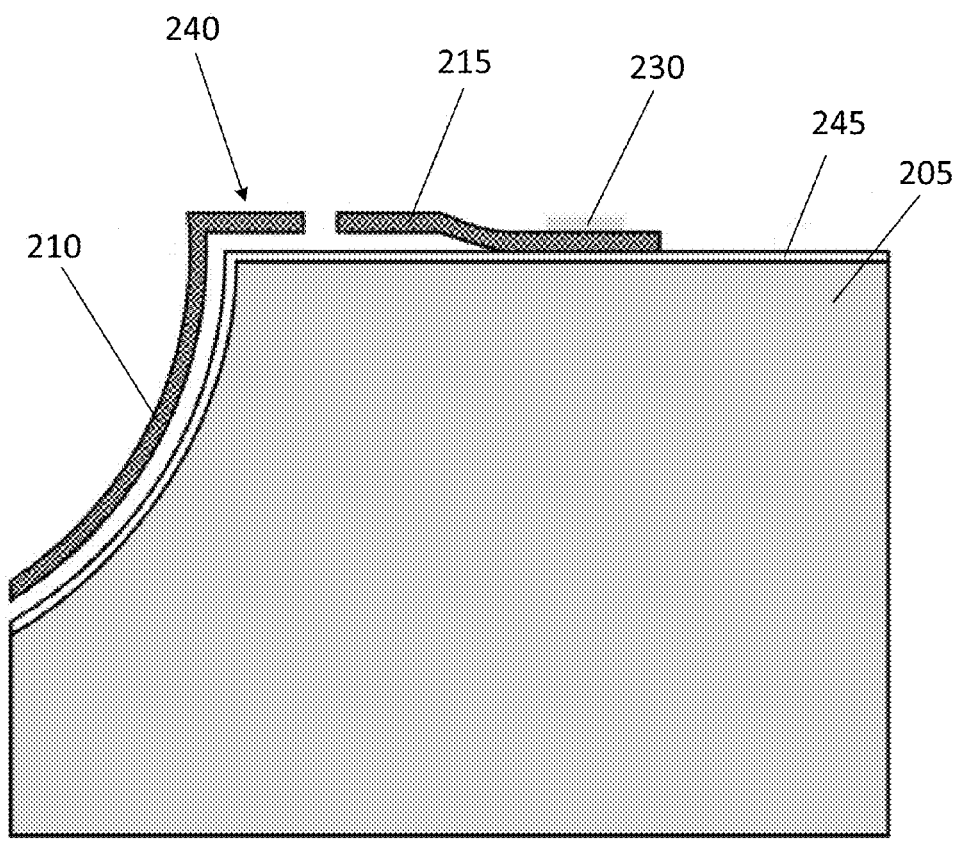
FIG. 2C is a cross-sectional view of an implementation of a MEMS gyroscope for use in the system of FIG. 1 having a conductive resonator, according to an illustrative implementation.

FIG. 2C is a cross-sectional view of an implementation 203 of a MEMS gyroscope for use in the system of FIG. 1 having a conductive resonator. A substrate 205 having a hemispherical cavity is shown. Also shown is the resonator 210 and an electrode 215. A bond pad 230 is located on top of the electrode 215. The resonator 210 includes a lip 240. The top surface of the substrate 205 is separated from the electrode 215 by an insulating coating 245. In other implementations, the substrate 205 can be formed from an insulating material, eliminating the need for the insulating coating 245. Although only one electrode 215 is shown in the cross-sectional view, any number of electrodes could be included in the device 200. In some implementations, the number of electrodes 215 included in the device 200 is a multiple of eight (e.g., a multiple of eight ranging from eight to 128 or more).

Rather than positioning the electrode 215 beneath the lip 240 of the resonator 210 or along the side of the hemispherical cavity, as shown in FIG. 2B, the implementation 203 of FIG. 2C includes the electrode 215 aligned horizontally with the lip 240 of the resonator 210. Because the electrode 215 and the resonator 210 are electrically conductive, voltage applied to the electrode 215 can cause actuation of the resonator 215, as described above. Likewise, the electrode 215 can also be used to sense the movement of the resonator 210. The alignment of the electrode 215 with the lip 240 of the resonator 210 provides a number of benefits. For example, MEMS manufacturing techniques typically build devices such as the device 203 in layers. Therefore, positioning an electrode 215 directly beneath the lip 240 requires at least two fabrication steps, because the electrode and the lip 240 are two separate layers. By aligning the electrode 215 in the same plane as the lip 240, the electrode 215 and the lip 240 can be manufactured in a single step, which allows for a simpler fabrication process. Additionally, manufacturing the electrode 215 and the lip 240 in the same fabrication step can result in more precise alignment between the electrode 215 and the lip 240, which can increase the performance of the device 203.

Figure 2D:
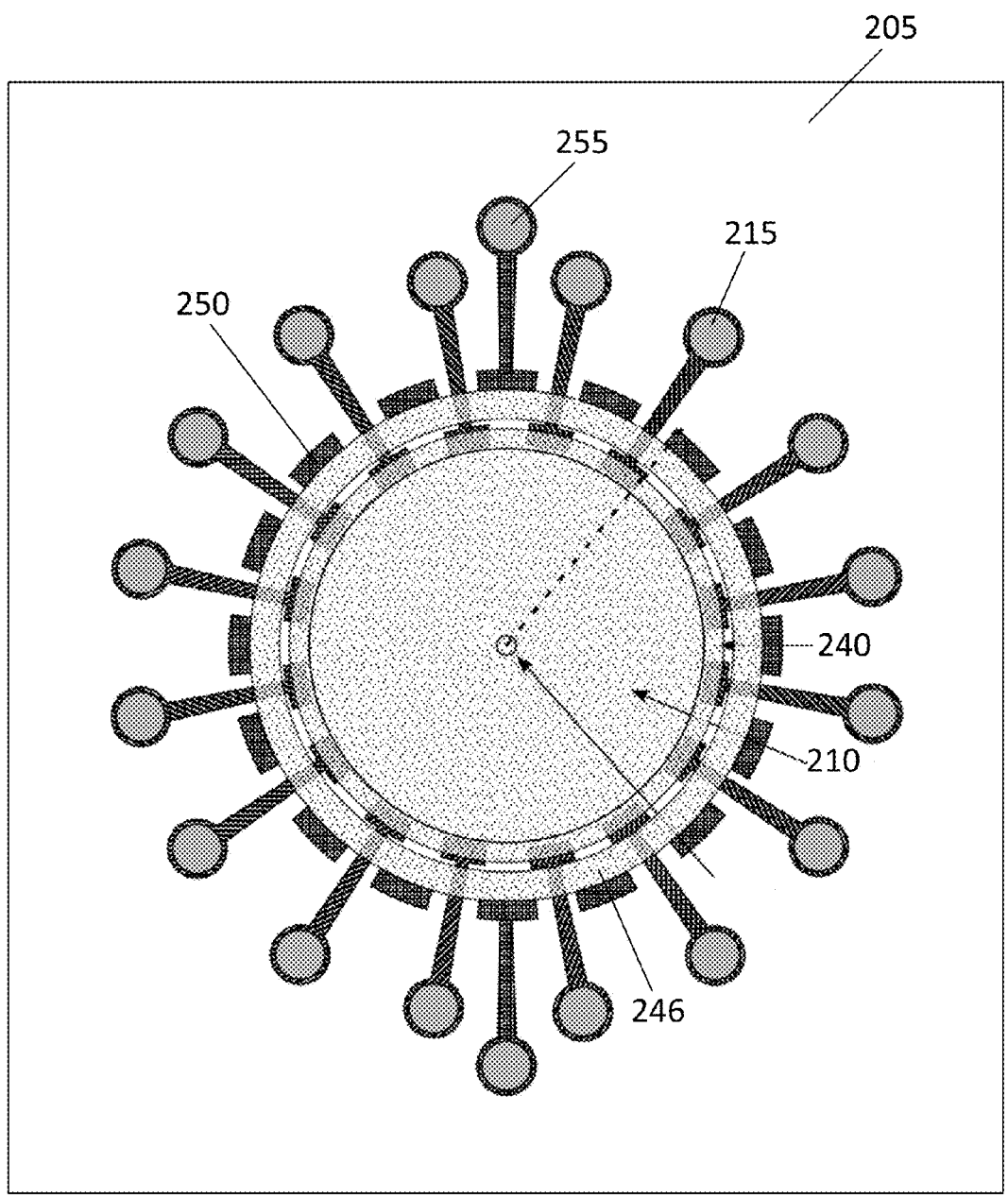
FIG. 2D is a top view of an implementation of a MEMS gyroscope for use in the system of FIG. 1 having a conductive resonator, according to an illustrative implementation.

FIG. 2D is a top view of an implementation 204 of a MEMS gyroscope for use in the system of FIG. 1 having a conductive resonator. The surface of the substrate 205 is shown. The resonator 210 extends into a hemispherical cavity in the substrate 205. Attached to and surrounding the resonator 210 is a lip 240. As described above, the lip 240 is elevated above the surface of the substrate 205. On the surface of the substrate 205 are sixteen electrodes 215. A portion of each electrode 215 is located directly beneath the lip 240 of the resonator 210. The device 204 also includes a continuous ring electrode 246 surrounding the resonator 210. The ring electrode 246 is elevated above the surface of the substrate 205 and is aligned with the lip 240 of the resonator 210. Anchors 250 connect the ring electrode 246 to the substrate 250. The ring electrode 246 also includes bond pads, such as bond pad 255.

The ring electrode 246 can be formed in the same manufacturing step as the resonator 210, as described above in connection with FIG. 2C. Because of its continuous shape, the ring electrode 246 can be used to actuate the resonator 210, causing the resonator 210 to vibrate in a first vibrational mode with constant amplitude and no preferred orientation, which can be difficult to achieve with discontinuous, segmented electrodes. The segmented electrodes, such as electrode 215, can then be used to sense the vibration of the resonator 210. Rotation of the device 200 can be determined based on the detected difference between the known amplitude and vibrational mode of the resonator 210 due to the actuation by the ring electrode 246 and the actual amplitudes measured by each electrode 215. In one implementation, the resonator 210 and ring electrode 246 are formed from doped conductive diamond, and the electrodes 215 are formed from a conductive material deposited onto the surface of the substrate 205.

Figure 3A:
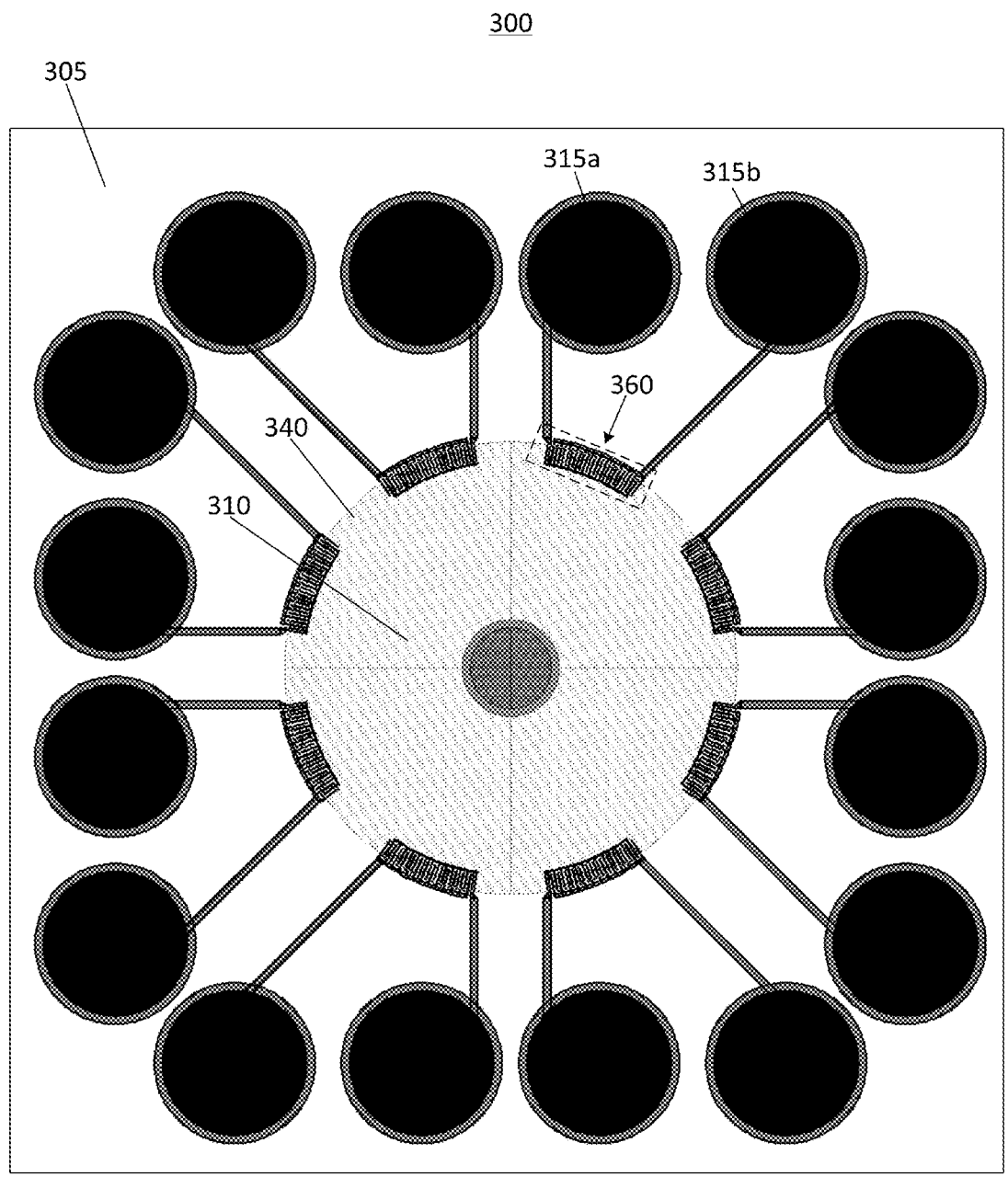
FIG. 3A is a top view of an implementation of a MEMS gyroscope for use in the system of FIG. 1 having an insulating resonator, according to an illustrative implementation.

FIG. 3A is a top view of an implementation 300 of a MEMS gyroscope for use in the system of FIG. 1 having an insulating resonator. The device 300 includes a substrate 305 having a planar surface into which a hemispherical cavity has been formed. A hemispherical resonator 310 is suspended within the cavity by a stem on the center of its bottom surface. The resonator 310 includes a lip 340 surrounding its edge and suspended above the surface of the substrate 305. Eight electrode pairs, such as electrodes 315a and 315b, are located on the surface of the substrate 305. The electrodes 315a and 315b include an interdigitated portion 360 located on the surface of the substrate 305 beneath the lip 340 of the resonator 310. The pairs of electrodes 315 are arranged with radial symmetry around the cavity of the substrate 305. In some implementations, the number of pairs of electrodes 315 is a multiple of eight (e.g., a multiple of eight in the range of eight to 128 or more).

Figure 3B:
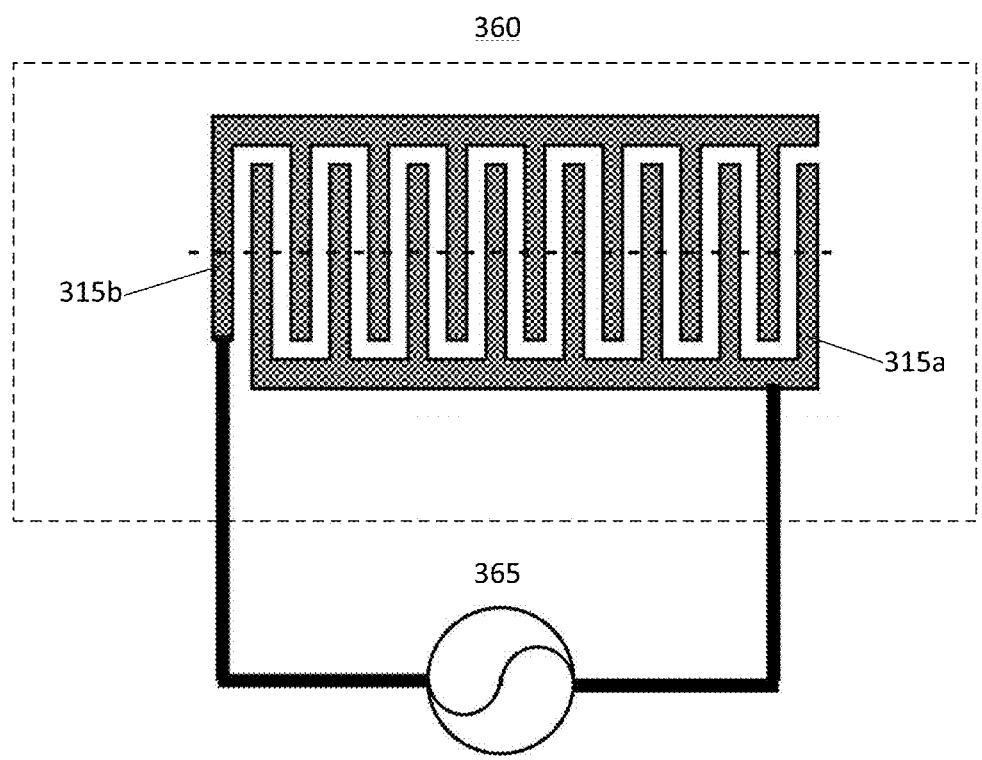
FIG. 3B is an enlarged view of a portion of the MEMS gyroscope of FIG. 3A, according to an illustrative implementation.

FIG. 3B is an enlarged view of the interdigitated portion 360 of the MEMS gyroscope of FIG. 3A. For clarity, the lip 340 of the resonator 310 has been removed from FIG. 3B. The lip 340 would normally be positioned directly above the interdigitated portion 360 of the electrodes 315a and 315b. The interdigitated portion 360 includes interdigitated electrical contacts that form each electrode 315a and 315b. The time-varying voltage source 365 represents the voltage difference between electrode 315a and 315b. Because the electrodes 315a and 315b are separated by a narrow insulating gap in the interdigitated portion 360, the electrodes 315a and 315b act as capacitors. As shown in FIG. 3B, the width of the gap between the electrodes 315a and 315b is not insignificant relative to the size of the electrodes 315a and 315b themselves. Therefore, a fringing electric field will develop outside of the space between the electrodes 315a and 315b (i.e., extending upwards perpendicular to the surface of the substrate 305 on which the electrodes 315a and 315b are mounted).

Figure 3C:
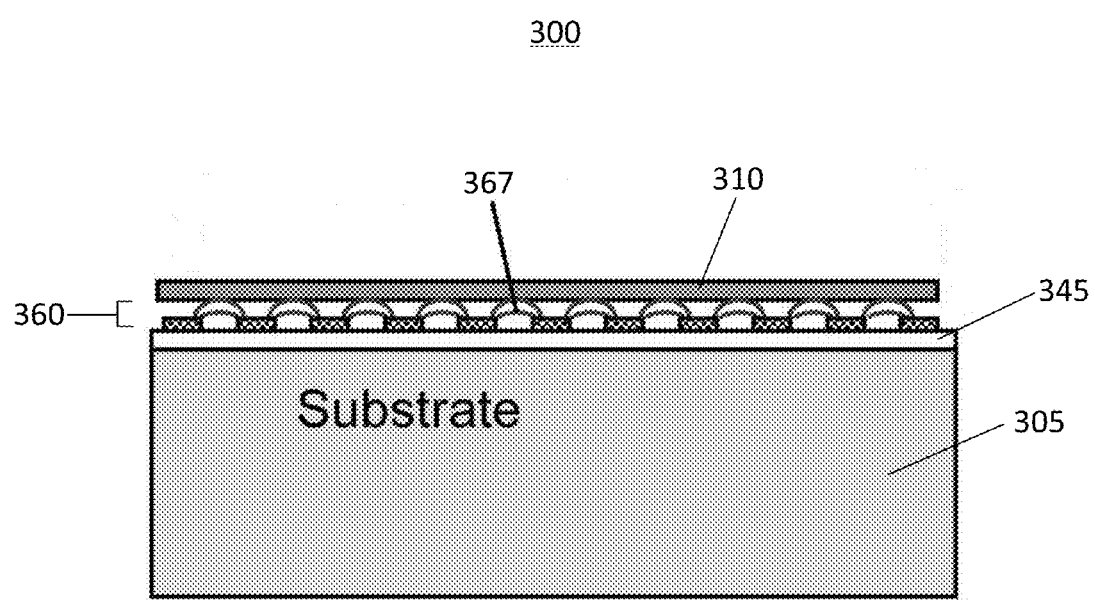
FIG. 3C is a cross-sectional view of the MEMS gyroscope of FIG. 3A, according to an illustrative implementation.

The resonator 310, including the lip 340 positioned above the interdigitated region 360, is made from a dielectric material in this implementation. However, the resonator 310 can still be actuated electrostatically by the fringing fields created by the interdigitated electrodes 315a and 315b. FIG. 3C is a cross-sectional view of the MEMS gyroscope of FIG. 3A, which illustrates the actuation of the resonator 310 by fringing electric fields in the interdigitated region 360 of the electrodes 315a and 315b. The fringing field 367 is shown between the interdigitated region 360 and the resonator 310. Also shown in FIG. 3C is an insulating layer 345 separating the electrodes 315a and 315b from the substrate 305. Thus, by applying controlled voltages to the pairs of electrodes 315a and 315b, the resonator 310 can be caused to vibrate according to a first vibrational mode. Rotation of the device 300 will cause the vibrational mode of the resonator 310 to change. This change can be then detected as discussed above and can be used to determine a degree of rotation of the device 300.

The device 300 can have a resonator 310 manufactured with very high precision, because it is not necessary to add a layer of conducting material (i.e., a metal) to the resonator 310. An advantage of this implementation is that it allows for a higher achievable dimensionless mechanical quality factor, called a Q factor, which reduces the rate at which energy is lost from the resonator 310 when it is vibrating. The Q factor represents a value equal to $2\pi$ times the total mechanical energy divided by the energy lost per vibration cycle.

Figure 4A:
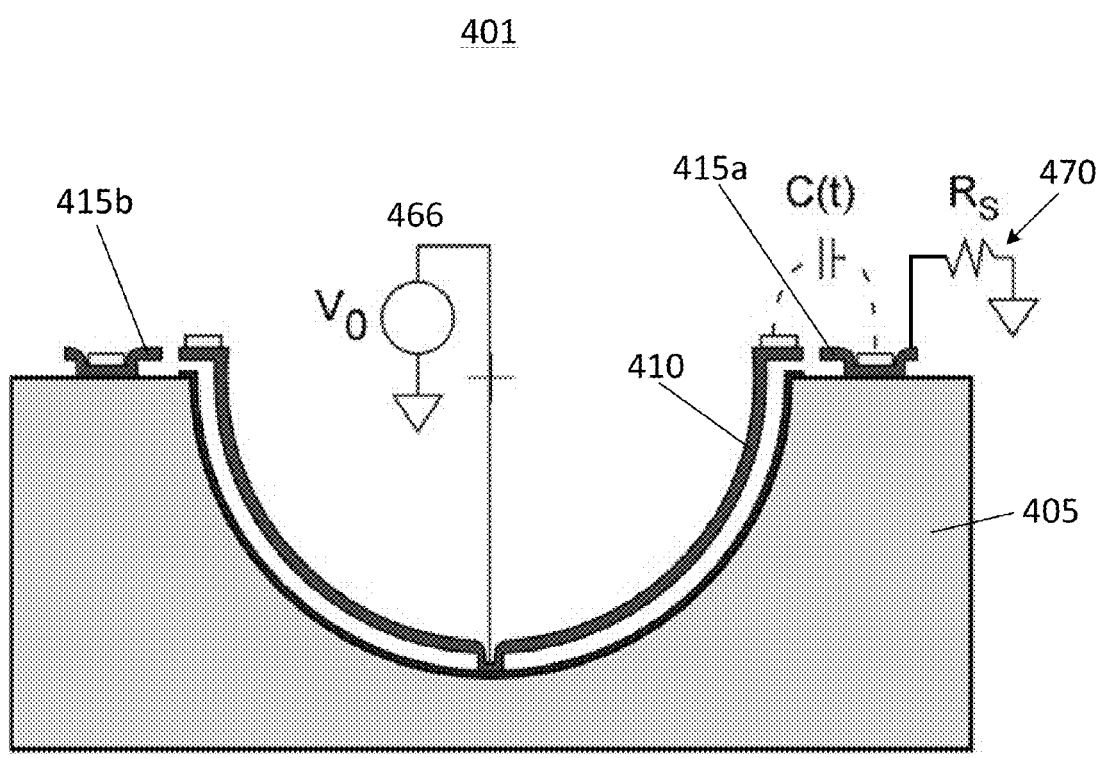
FIG. 4A is a circuit diagram illustrating a first technique for changing the mechanical Q factor for a vibrational mode of an implementation of a MEMS gyroscope for use in the system of FIG. 1, according to an illustrative implementation.

FIG. 4A is a circuit diagram 401 illustrating a first technique for changing the mechanical Q factor for a vibrational mode of an implementation 400 of a MEMS gyroscope for use in the system of FIG. 1. The gyroscope 400 includes a substrate 405 having a planar surface and a hemispherical cavity. A hemispherical resonator 410 is suspended within the cavity by a stem. Electrodes 415a and 415b are positioned on the surface of the substrate 405 around the cavity. The resonator 410 can be actuated by applying voltages to the electrodes 415a and 415b. As the resonator 410 vibrates, the capacitance between the resonator 410 and the electrode 415a will vary. This is shown in FIG. 4A as the capacitance C(t). A voltage source 466 applies a bias voltage $V_0$ to the resonator 410. Also shown is a damping resistor 470 having a resistance value of $R_s$ between the electrode 415a and electrical ground. Electrode 415a can be an actuation electrode or a sensing electrode.

As discussed above in connection with FIGS. 2A-2D, the resonator 210 can have two separate vibrational modes. Each mode can have a unique Q factor. Accuracy of the gyroscope depends in part on the degree to which the Q factors for each vibrational mode match. Therefore, a technique for adjusting the Q factor for a vibrational mode is desirable. The resistor 470 dissipates energy as the capacitance C(t) changes, effectively damping the vibration of the resonator 410. This corresponds to a decrease in the Q factor for the vibrational mode associated with electrode 415a. The value $R_s$ of the resistor 470 can be selected to achieve a desired reduction in the Q factor. For example, if a first vibrational mode associated with electrode 415a has a Q factor that is higher than the Q factor associated with a second vibrational mode, the resistor 470 can be selected to reduce the Q factor of the first vibrational mode, so that the Q factors of the two modes more closely match each other. In some implementations, the resistor 470 can be selected to achieve a Q in the range of about 20,000 to about 10,000,000. While only one resistor 470 is shown in FIG. 4A, in some implementations, more than one resistor can be used. For example, resistors can be placed at the appropriate electrodes to reduce the Q factor by a desired amount. If more than one resistor is used, the resistors may have different resistance values.

Figure 4B:
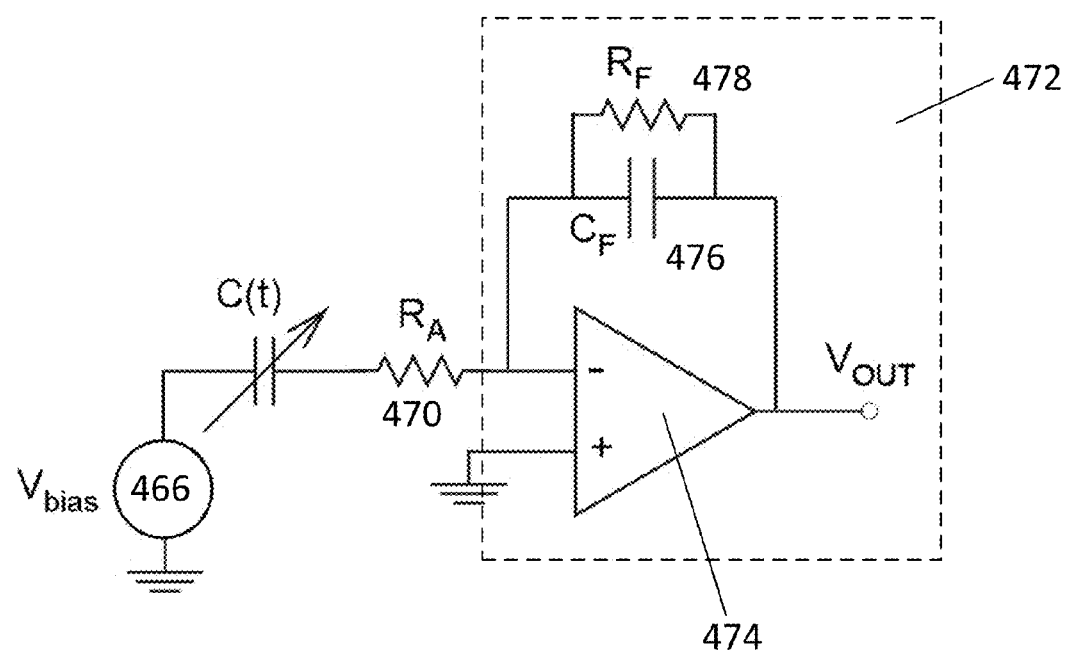
FIG. 4B is a circuit diagram illustrating a second technique for changing the mechanical Q factor for a vibrational mode of an implementation of a MEMS gyroscope for use in the system of FIG. 1, according to an illustrative implementation.

FIG. 4B is a circuit diagram 402 illustrating a second technique for changing the mechanical Q factor for a vibrational mode of an implementation of a MEMS gyroscope for use in the system of FIG. 1, according to an illustrative implementation. The circuit contains a voltage source 466 corresponding to the bias voltage applied to the resonator 410 and a damping resistor 470. The capacitance C(t) represents the changing capacitance between the resonator 410 and the electrode 415a as the resonator 410 vibrates. A charge amplifier 472 used for detecting the movement of the resonator 410 is connected in series with the damping resistor 470. The charge amplifier 472 consists of an operational amplifier 474, a feedback capacitor 476, and a feedback resistor 478. As discussed above, the damping resistor 470 can be used to reduce the Q factor of a vibration mode by dissipating electrical energy at the input of the charge amplifier 472. For example, in some implementations the Q factor can be reduced by using the phase shift and finite gain of the operational amplifier 474.

Figure 5A:
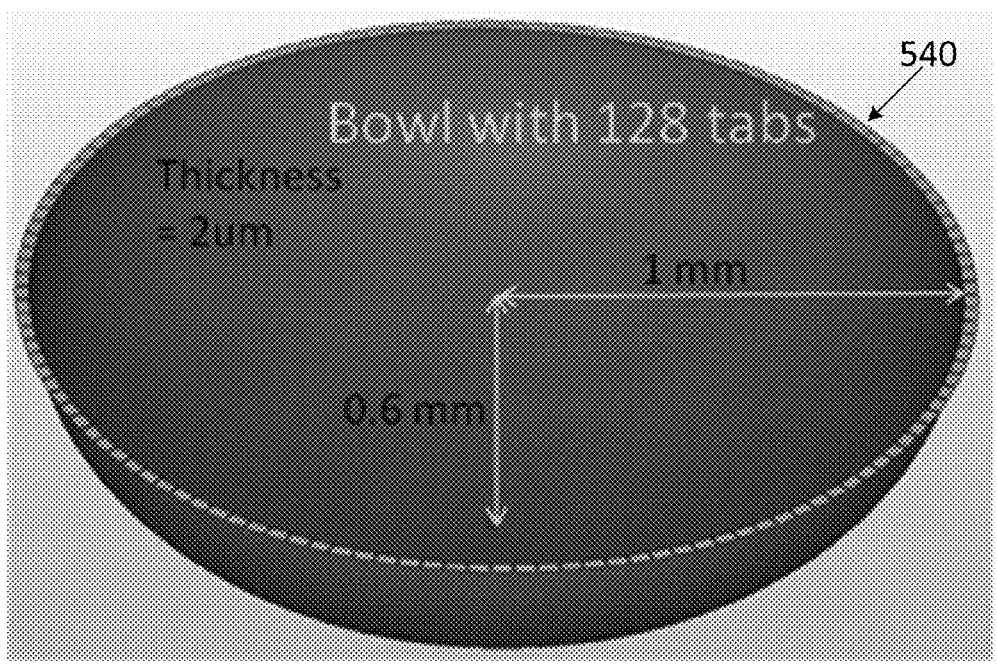
FIG. 5A is a resonator having a segmented lip for use in the system of FIG. 1, according to an illustrative implementation.

FIG. 5A is a resonator 510 having a segmented lip 540 for use in the system of FIG. 1. The resonator 510 is hemispherical in shape and is intended to be suspended within a hemispherical cavity. The lip 540 of the resonator 510 includes a plurality of segments. The segments are approximately equal in size, as are the gaps separating the segments. In some implementations, the number of segments is a multiple of eight. For example, the lip 540 can include 8, 16, 32, 40, 48, 56, 64, 72, 80, 88, 96, 104, 112, 120, or 128 segments. The segmented lip 540 can be used to match the resonant frequencies of the vibrational modes of the resonator 510, which, when installed in the gyroscope of FIG. 1, can increase its accuracy. In some implementations, constant voltages can be applied to a subset of the resonator electrodes to trim quadrature and frequency separation.

Figure 5B:
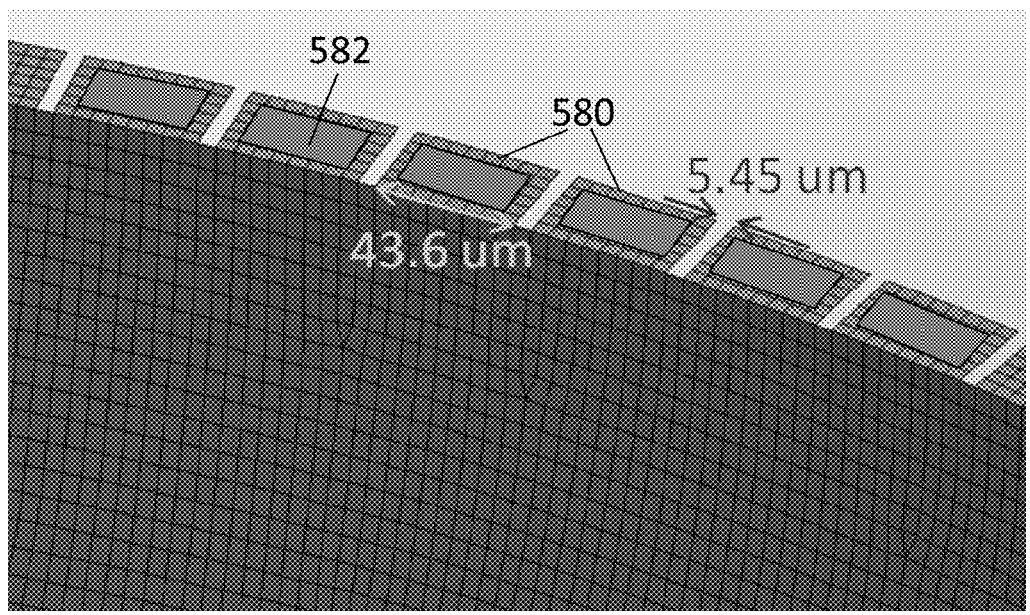
FIG. 5B is an enlarged view of a portion of the resonator of FIG. 5A, according to an illustrative implementation.

FIG. 5B is an enlarged view of a portion of the resonator 510 of FIG. 5A. Segments 580 of the lip 540 are shown. Each segment 580 includes a pad 582, which can be made from a metal such as gold or copper, for example. The segmented lip 540 prevents stiffening of the resonator 540, thereby decreasing its resonant frequency. The mass of the pads 582 can be individually trimmed, for example by use of a laser to remove a portion of the pad 582. In some implementations, the mass of the pads 582 may be precisely controlled by a precision deposition process. For example, after a pad 582 has been added, a precise amount of additional material may be added to the pad. The amount of material to be trimmed from or added to each pad 582 can be selected to achieve more closely matched resonant frequencies for the vibrational modes of the resonator 510. Removal of material from each pad 582 has a relatively small impact on the Q factor of the resonator 510, and this approach can therefore be preferable to other methods of removing material from the resonator 510 to alter its resonant frequencies (e.g., removing material from the segments 580, themselves, or from the hemispherical portion of the resonator 510 by laser trimming), though removing such other material may also be carried out without departing from the scope of this disclosure).

Figure 6A:
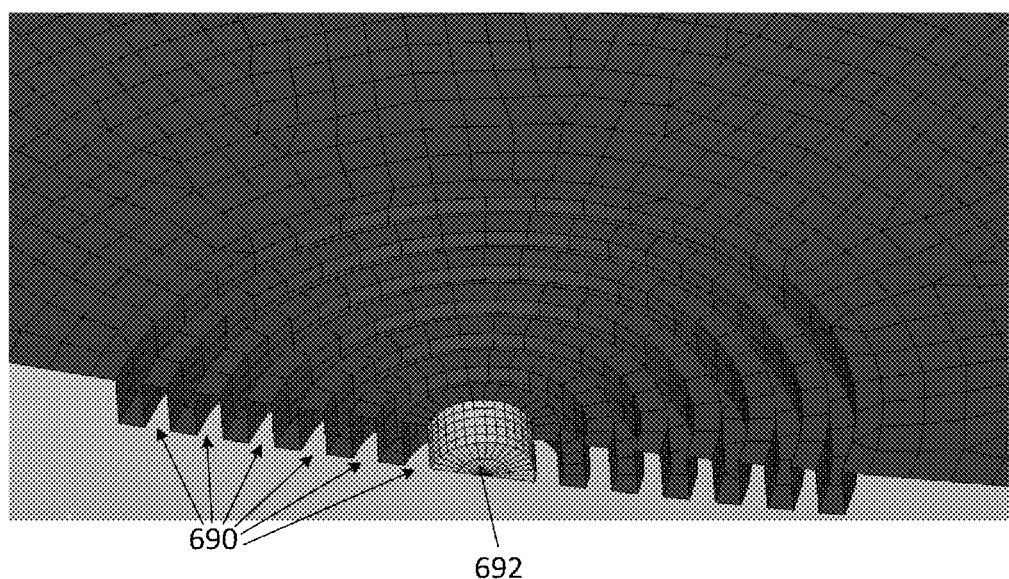
FIG. 6A is a cross-sectional view of a corrugated resonator for use in the system of FIG. 1, according to an illustrative implementation.

FIG. 6A is a cross-sectional view of a corrugated resonator 610 for use in the system of FIG. 1. The bottom portion of the resonator 610 includes corrugations formed by concentric channels 690 surrounding the center 692 of the resonator 610. In use, the resonator 610 can be suspended within a hemispherical cavity by a stem coupled to the center 692. As the resonator 610 vibrates, energy is lost through the stem, resulting in a decreased Q factor. The channels 690 can help to reduce the amount of energy lost through the stem, thereby increasing the Q factor of the resonator 610. The increased Q factor achieved by including the channels 690 on the resonator 610 can increase the accuracy of the gyroscope 100 of FIG. 1. In some implementations, the amount of mechanical stress absorbed by the stem can be reduced by about a factor of ten when the channels 690 are included in the resonator 610. The resonator can include from 1 to about 100 corrugation channels. Each corrugation channel can be in the range of about 5 microns to about 50 microns deep.

Figure 6B:
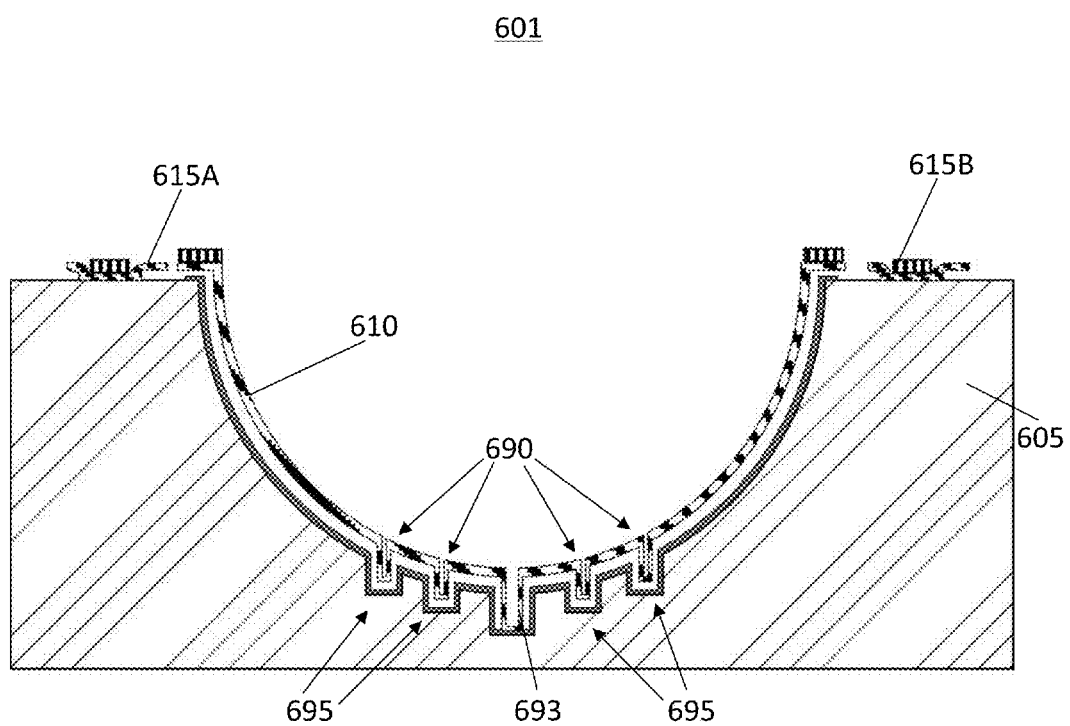
FIG. 6B is a cross-sectional view of an implementation of a MEMS gyroscope for use in the system of FIG. 1, according to an illustrative implementation.

FIG. 6B is a cross-sectional view of an implementation 601 of a MEMS gyroscope for use in the system of FIG. 1. The gyroscope 601 includes substrate 605 and a corrugated resonator 610 similar to the corrugated resonator shown in FIG. 6A. The resonator includes concentric channels 690 surrounding the stem 693. The concentric channels 690 create corrugations that can reduce the mechanical energy loss experienced by the resonator in its first vibrational mode. Also shown in FIG. 6B are electrodes 615A and 615B.

The cavity of the substrate 605 has channels 695 corresponding to the channels 690 of the resonator 610. The substrate channels 695 have a larger width than the resonator channels 690, allowing the resonator channels 690 to extend into the substrate channels 695. The substrate 605 also includes an indentation into which the stem 693 can be inserted, so that the stem 693 connects to the substrate 605 at a depth below the bottom of the substrate cavity.

Figure 7A:
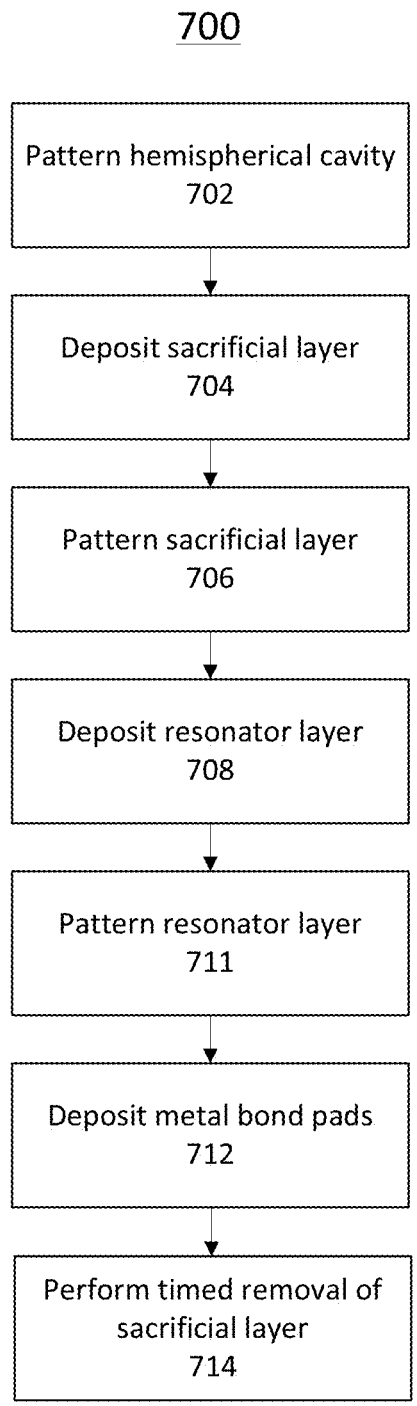
FIG. 7A is a flow diagram of a first method for fabricating a MEMS gyroscope, according to an illustrative implementation.

FIG. 7A is a flow diagram of a first method 700 for fabricating a MEMS gyroscope. The method 700 includes the steps of patterning a hemispherical cavity into a substrate material (Step 702), depositing a sacrificial layer (Step 704), patterning the sacrificial layer (Step 706), depositing a resonator layer (Step 708), patterning the resonator layer (Step 711), depositing metal bond pads (Step 712), and performing a timed removal of the sacrificial layer (Step 714).

Figure 7B:
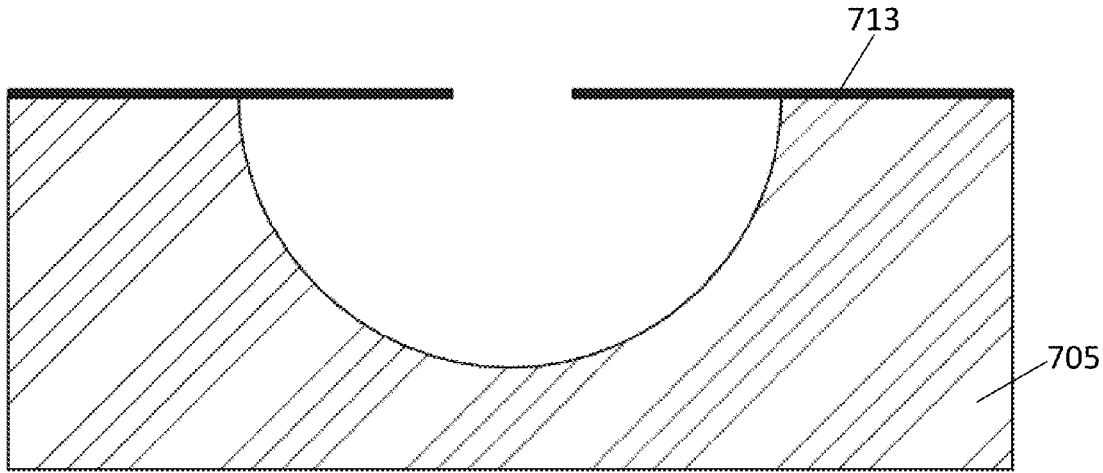
FIGS. 7B-7G depict cross-sectional views of a MEMS gyroscope at various stages in the fabrication method of FIG. 7A, according to an illustrative implementation.

FIGS. 7B-7G depict cross-sectional views of a MEMS gyroscope 701 at various stages in the fabrication method 700 of FIG. 7A, and will be described concurrently with the method 700. The method 700 includes the step of patterning a hemispherical cavity into a substrate (Step 702). The hemispherical cavity is formed by an isotropic wet or plasma dry etch. The etch is performed through an etch mask which resists the etch chemistry. Openings are created in the etch mask layer using photolithography and an etch specific to the etch mask. The substrate can be formed from an amorphous material, such as glass, in order to improve the precision of the patterned cavity. For example, the substrate can include glass such as CORNING 1715 glass manufactured by Corning Incorporated of Corning, N.Y. In some implementations, the substrate can be also formed from any amorphous material having an annealing temperature in the range of about 750 degrees Celsius to about 1000 degrees Celsius and an average coefficient of thermal expansion in the range of about 2 ppm/K to about 4 ppm/K at temperatures from about 20 degrees Celsius to about 800 degrees Celsius. In some implementations, the substrate 105 can be formed from silica, silicon, Pyrex, or Schott Borofloat. FIG. 7B shows the device 701 having a substrate 705 and a masking layer 713 that can be formed from diamond, polysilicon, silicon nitride, silicon carbide (e.g., by low-pressure chemical vapor deposition or plasma-enhanced chemical vapor deposition), diamond-like carbon, or platinum, for example. In some implementations, the masking layer 713 can have a thickness in the range of about 0.05 microns to about 20 microns. After the cavity has been patterned to the desired size, the masking layer 713 is removed. In some implementations, patterning the hemispherical cavity can also include patterning a series of concentric channels into the bottom of the hemispherical cavity in order to reduce energy losses from the resonator to the substrate.

Figure 7C:
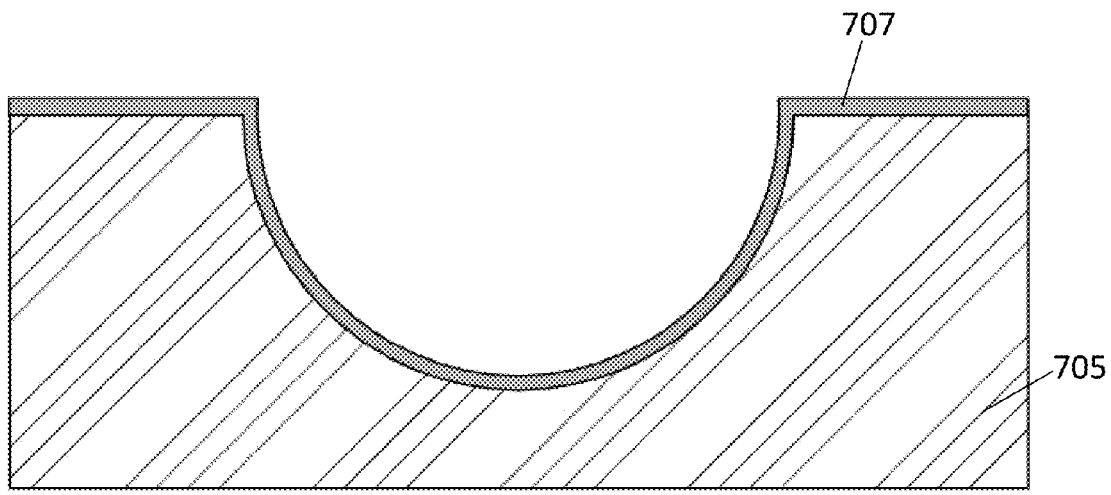

The method 700 includes the step of depositing a sacrificial layer (Step 704). In some implementations, the sacrificial layer can be formed from polysilicon, titanium, tantalum, or germanium. The sacrificial layer provides a barrier between the wall of the cavity and the layer that will form the resonator in a later step of the method 700. Therefore, when the sacrificial layer is removed in Step 714, a gap will be formed between the cavity and the resonator. FIG. 7C shows the device 701 with the substrate 705 covered by a sacrificial layer 707. The sacrificial layer 707 is of constant thickness and coats the upper surface of the substrate 705, as well as the walls of the hemispherical cavity. In some implementations, the sacrificial layer 707 can have a thickness in the range of about 0.05 microns to about 20 microns.

The method 700 includes the step of patterning the sacrificial layer (Step 706). In some implementations, the sacrificial layer can be patterned to create a circular gap surrounding the cavity. The substrate layer is revealed through the gap when the sacrificial layer is patterned away. The diameter of the circular gap can be selected to be larger than the diameter of the cavity, so that the resonator which will be formed in later steps can include a lip that is elevated above the surface of the substrate.

Figure 7D:
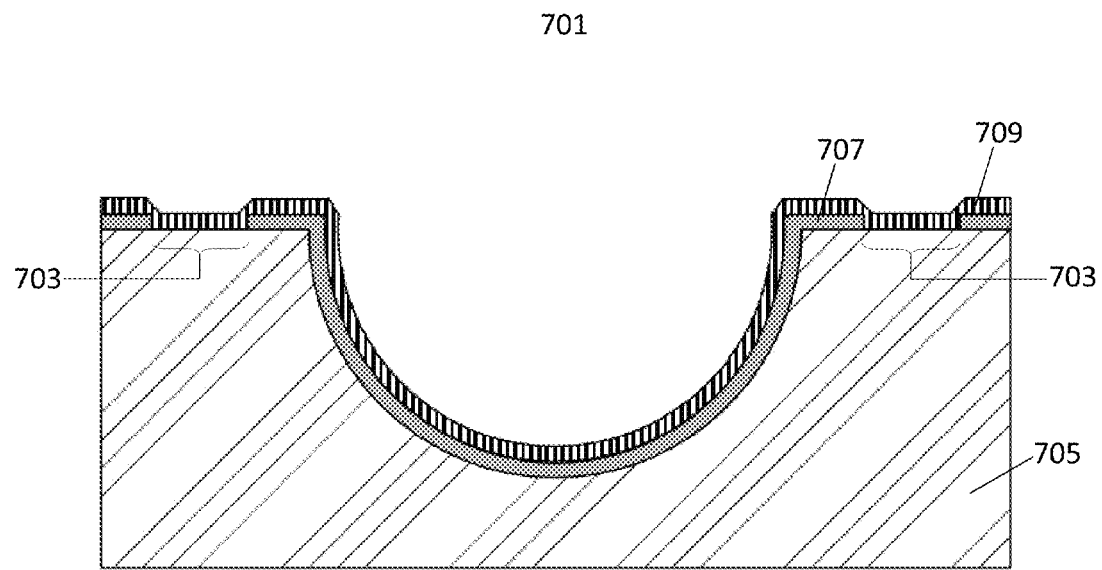
Figure 7E:
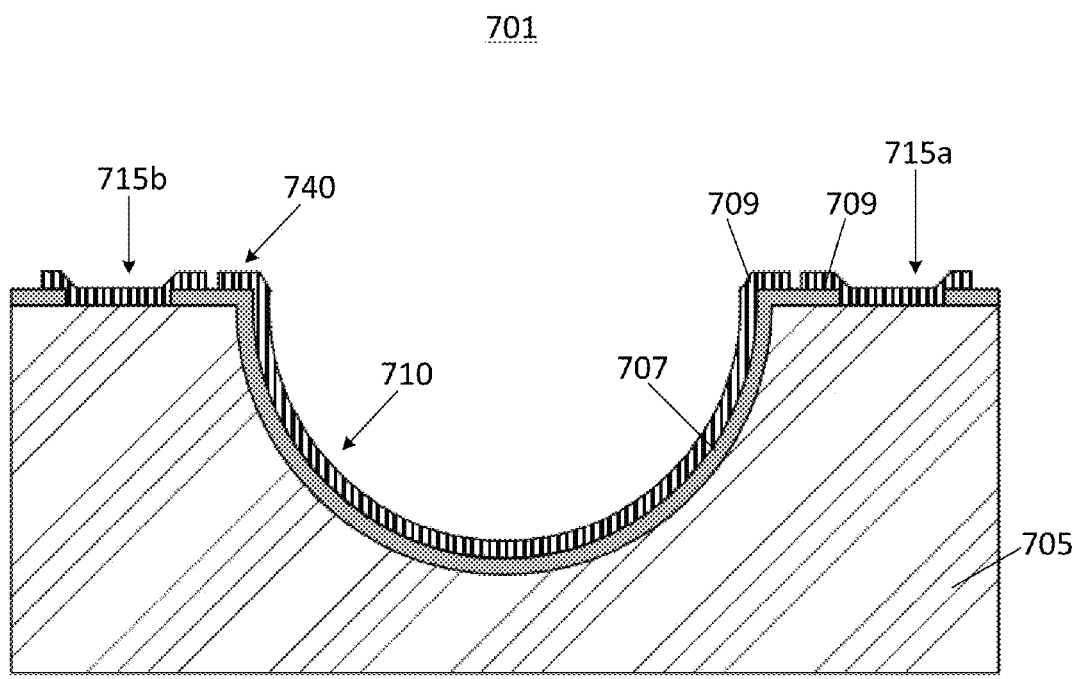

The method 700 includes the step of depositing a resonator layer (Step 708). The resonator layer can be formed from a conductive material such as conductive doped silicon carbide or conductive doped diamond. In some implementations, the resonator layer is deposited by a chemical vapor deposition process. FIG. 7D shows the device 701 with the resonator layer 709 deposited over the sacrificial layer 707. Portions of the sacrificial layer 707 have been patterned away over the substrate 705 in Step 706, resulting in areas where the substrate 705 is exposed during deposition of the resonator layer 709. For example, the sacrificial layer 707 has been patterned to create a circular gap surrounding the cavity. A cross-sectional view of the circular gap is shown in FIG. 7D. This area are therefore shown with the resonator layer 709 in direct contact with the surface of the substrate 705 in FIG. 7D. In some implementations, the resonator layer 709 can have a thickness in the range of about 0.05 microns to about 20 microns.

The method 700 includes the step of patterning the resonator layer (Step 711). Material from the resonator layer 709 can be removed to form a separate resonator 710, as well as electrodes 715a and 715b. As discussed above, the resonator 710 and the electrodes 715a and 715b can be aligned to a high degree of precision because they are formed from the same material during a single step of the method 700 (i.e., Step 708). The resonator layer 709 can be patterned so that the resonator 710 includes a lip 740 elevated above the surface of the substrate 705. In some implementations, the lip 740 can be segmented into tabs. In some implementations, the number of tabs can be a multiple of eight. In other implementations, there may be any other number of tabs. At Step 711 of the method 700, the resonator 710 and lip 740 are also positioned above the sacrificial layer 707, which can be removed in a later step. An etch mask not shown in FIG. 7E can be applied to the resonator layer prior to patterning. In some implementations, the etch mask is made from chromium or aluminum (deposited by evaporation or sputtering) or silicon dioxide (applied by a plasma-enhanced chemical vapor deposition, evaporation or CVD process). The resonator layer 709 can then be etched using oxygen plasma with a small percentage of gas containing fluorine, such as sulfur hexafluoride or carbon tetrafluoride.

Figure 7F:
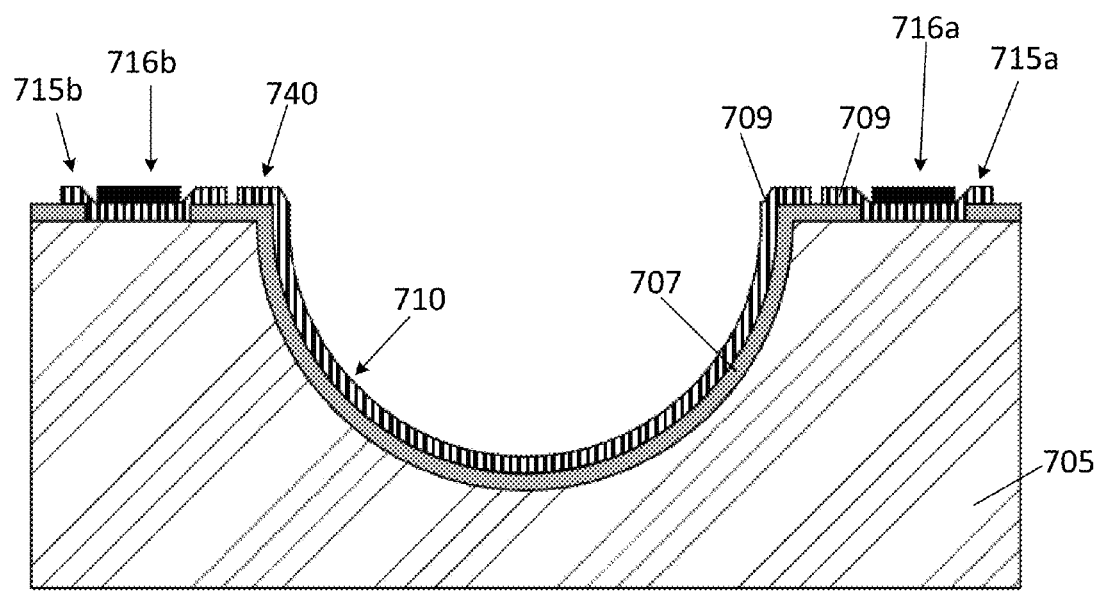

The method 700 includes the step of depositing metal bond pads (Step 712). Bond pads can be formed from a metal or other electrically conductive material, such as copper or gold, deposited onto the electrodes 715a and 715b. A lift off process in which a stencil layer is applied, the bond pad material is deposited, and the stencil is then washed away, can be used to create the bond pads. FIG. 7F shows bond pads 716a and 716b deposited onto the electrodes 715a and 715b, respectively. The bond pads 716a and 716b can then be used to connect to other electrical circuitry (e.g., to monitor outputs from the electrodes 715a and 715b).

Figure 7G:
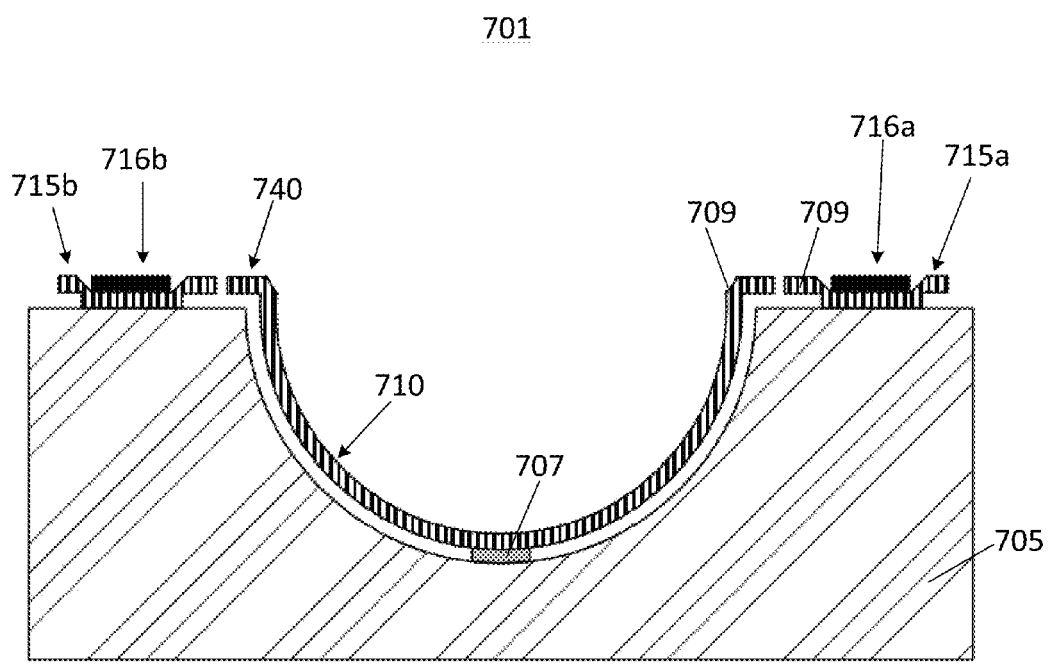

The method 700 also includes the step of performing a timed removal of the sacrificial layer (Step 714). The sacrificial layer is removed in this step, creating a gap between the resonator and the wall of the hemispherical cavity in the substrate, which allows the resonator to vibrate freely. A timed patterning process using xenon diflouride or tetra-methyl ammonium hydroxide can be used to remove the sacrificial layer. Sacrificial layer material is removed starting from the top of the device near the surface of the substrate. The patterning continues until a narrow gap has been created by the removal of the sacrificial layer along the sides of the resonator. The patterning process concludes when a relatively small amount of the sacrificial layer remains between the center of the bottom of the cavity and the center of the bottom of the resonator. This remaining material will become the stem coupling the resonator to the substrate. FIG. 7G shows the device 701 in its final configuration with the sacrificial layer 707 removed from the sides of the hemispherical cavity. A small amount of material from the sacrificial layer 707 remains, to act as the stem coupling the resonator 710 to the substrate 705. Also shown are the electrodes 715a and 715b formed from the resonator layer 709, and the resonator lip 740.

Figure 8A:
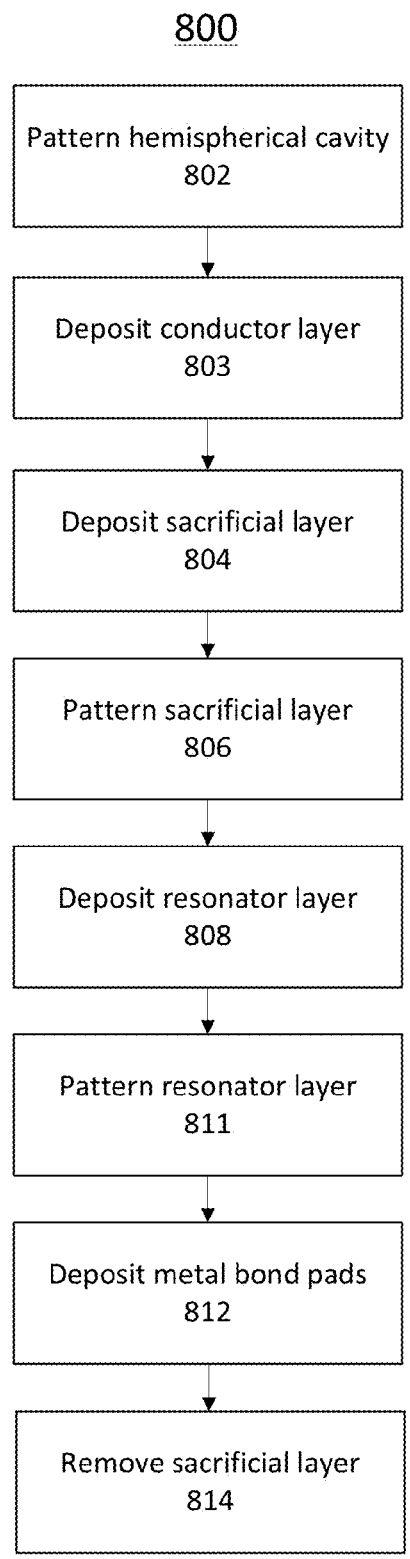
FIG. 8A is a flow diagram of a second method for fabricating a MEMS gyroscope, according to an illustrative implementation.

FIG. 8A is a flow diagram of a second method 800 for fabricating a MEMS gyroscope. The method 800 includes the steps of patterning a hemispherical cavity into a substrate material (Step 802), depositing a conductor layer (Step 803), depositing a sacrificial layer (Step 804), patterning the sacrificial layer (Step 806), depositing a resonator layer (Step 808), patterning the resonator layer (Step 811), depositing metal bond pads (Step 812), and removing the sacrificial layer (Step 814).

Figure 8B:
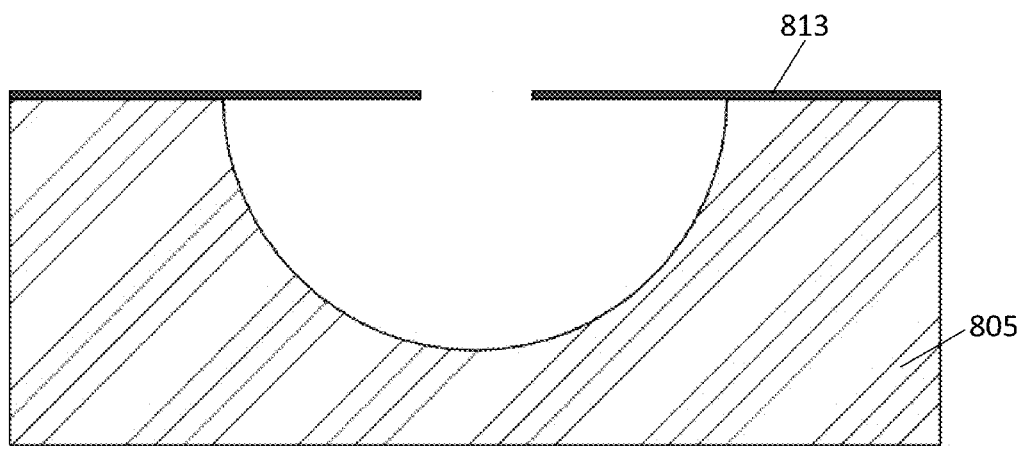
FIGS. 8B-8H depict cross-sectional views of a MEMS gyroscope at various stages in the fabrication method of FIG. 8A, according to an illustrative implementation.

FIGS. 8B-8G depict cross-sectional views of a MEMS gyroscope 801 at various stages in the fabrication method 800 of FIG. 8A, and will be described concurrently with the method 800. The method 800 includes the step of patterning a hemispherical cavity into a substrate (Step 802). The substrate can be formed from an amorphous material, such as glass, in order to improve the precision of the patterned cavity. For example, the substrate can include glass such as CORNING 1715 glass manufactured by Corning Incorporated of Corning, N.Y. In some implementations, the substrate can be also formed from any amorphous material having an annealing temperature in the range of about 750 degrees Celsius to about 1000 degrees Celsius and an average coefficient of thermal expansion in the range of about 2 ppm/K to about 4 ppm/K at temperatures from about 20 degrees Celsius to about 800 degrees Celsius. In some implementations, the substrate 105 can be formed from silica, silicon, Pyrex, or Schott Borofloat. FIG. 8B shows the device 801 having a substrate 805 and a masking layer 813 that can be formed from diamond, polysilicon, silicon nitride, silicon carbide (e.g., by low-pressure chemical vapor deposition or plasma-enhanced chemical vapor deposition), diamond-like carbon, or platinum, for example. In some implementations, the masking layer 813 can have a thickness in the range of about 0.05 microns to about 20 microns. When the cavity has been patterned to the desired size, the masking layer 813 is removed. In some implementations, patterning the hemispherical cavity can also include patterning a series of concentric channels into the bottom of the hemispherical cavity or the sacrificial layer in order to reduce energy losses from the resonator to the substrate.

Figure 8C:
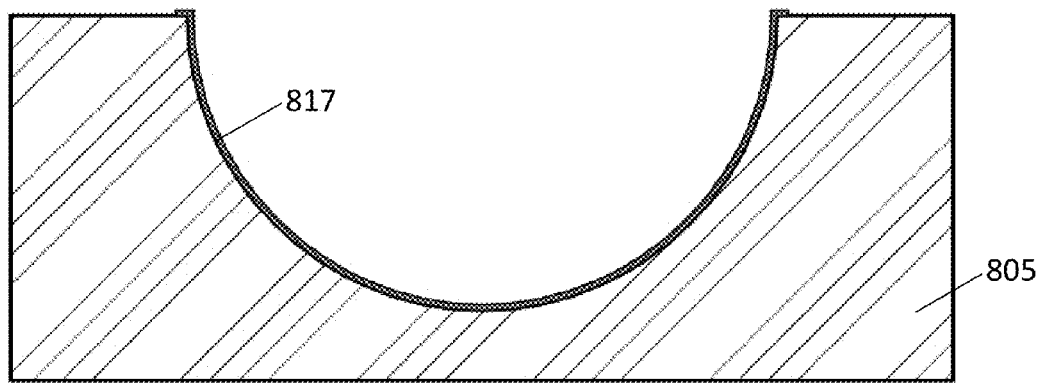

The method 800 includes the step of depositing a conductor layer (Step 803). The conductor layer can be a metal such as chromium, zirconium, cobalt, nickel, platinum, palladium, iridium, rhodium, iron, or rubidium. In some implementations, the conductor layer can be applied by a sputtering process. A photoresist can then be applied and exposed, and the conductor layer can be patterned. Alternatively, the conductor layer can be patterned using a lift-off technique in which the photoresist is applied and patterned before the conductor layer is deposited. As shown in FIG. 8C, the conductor layer 817 can cover the entire surface of the hemispherical cavity as well as a portion of the surface of the substrate 805 surrounding the cavity. In some implementations, the conductor layer 817 can have a thickness in the range of about 0.05 microns to about 20 microns.

The method 800 includes the step of depositing a sacrificial layer (Step 804). In some implementations, the sacrificial layer can be formed from polysilicon, titanium, tantalum, or germanium. The sacrificial layer provides a barrier between the conductive layer deposited on the wall of the cavity and the layer that will form the resonator in a later step of the method 800. Therefore, a gap will remain between the wall of the cavity and the resonator when the sacrificial layer is removed in Step 814.

Figure 8D:
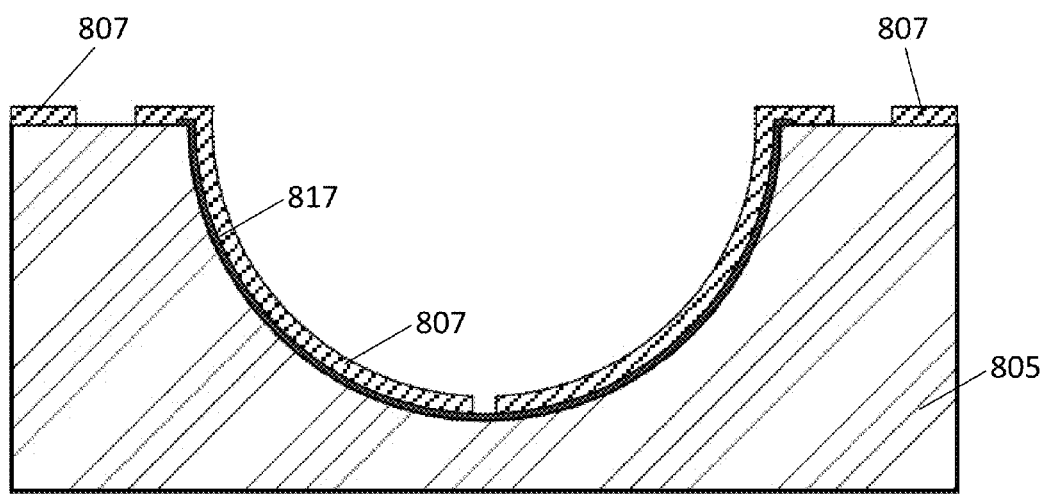
Figure 8E:
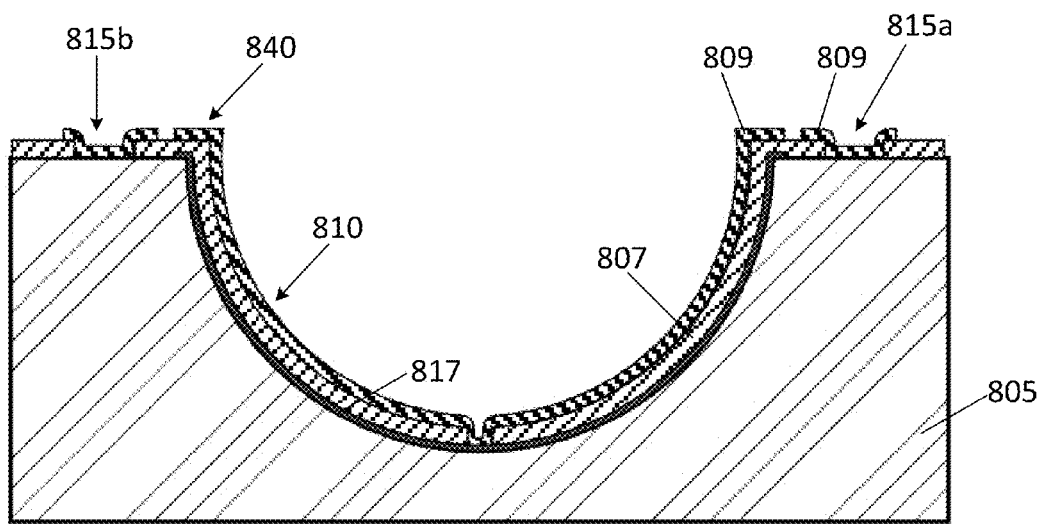
Figure 8F:
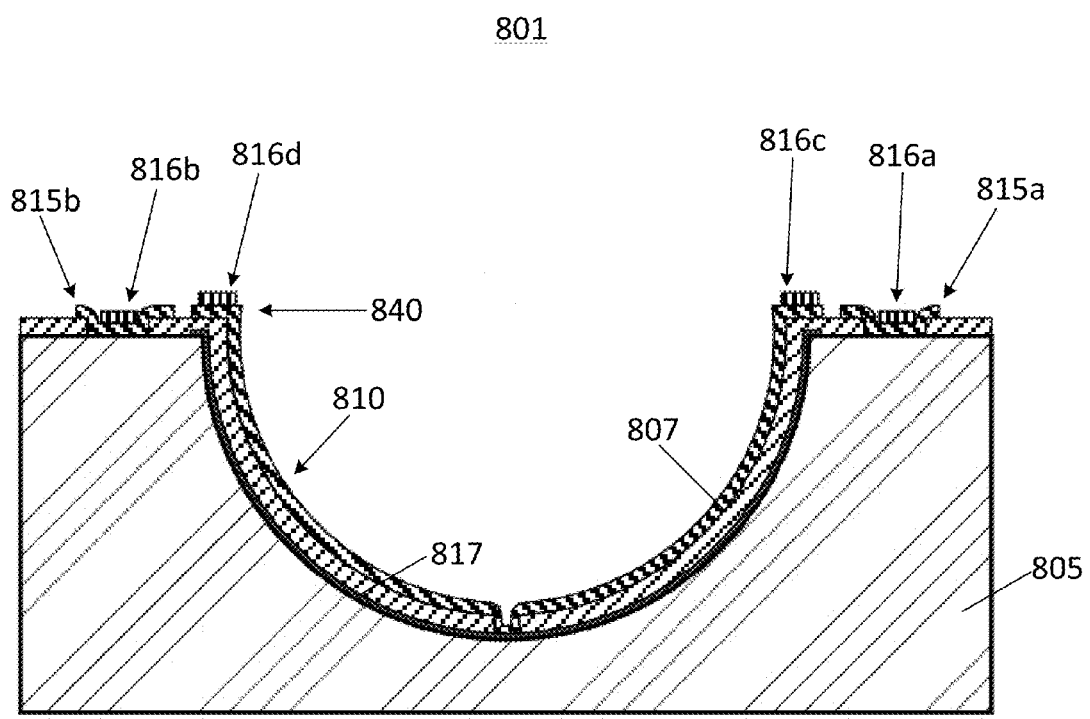
Figure 8G:
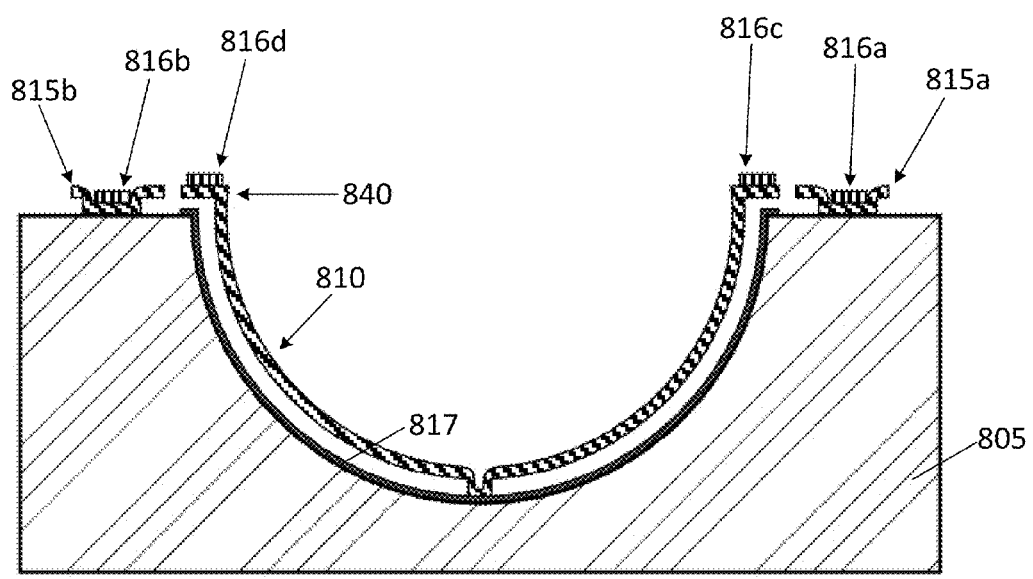
Figure 8H:
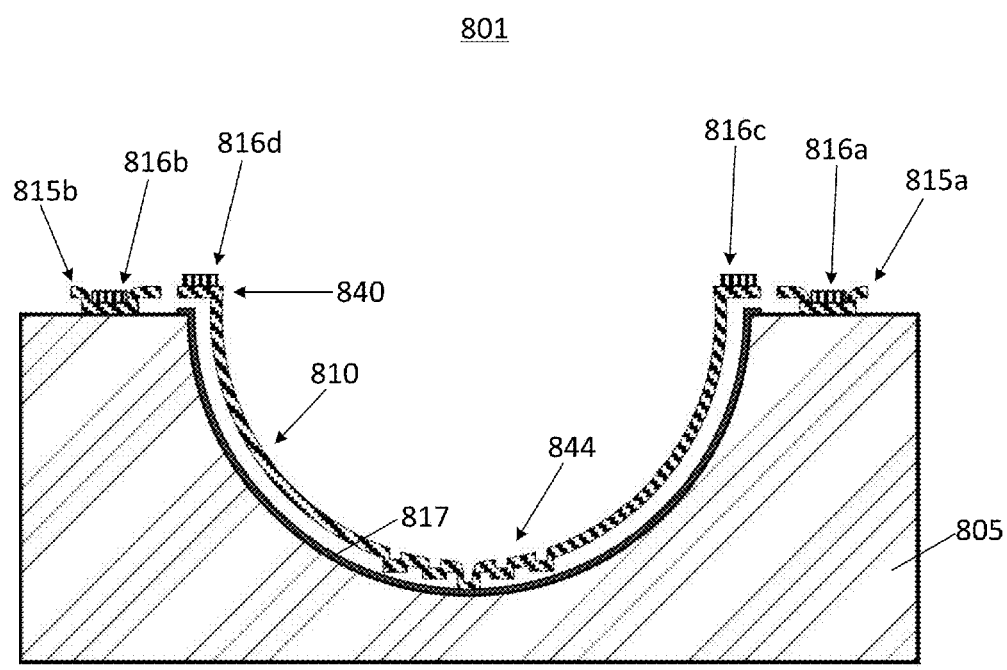

The method 800 includes the step of patterning the sacrificial layer (Step 806). In some implementations, the sacrificial layer can be patterned to create a narrow gap in the center of the bottom of the cavity, in the location where the stem will be formed to couple the resonator to the substrate in a later step. The sacrificial layer can also be patterned over the surface of the substrate 805 to provide space for the deposition of electrodes in a later step of the method 800. FIG. 8D shows the device 801 with the sacrificial layer 807 applied on top of the conductor layer 817 and the surface of the substrate 805. The sacrificial layer 807 is of constant thickness. In some implementations, the sacrificial layer 807 can have a thickness in the range of about 0.05 microns to about 20 microns. As discussed above, the sacrificial layer 807 has been patterned to allow for the deposition of material that will later become the stem of the resonator and the electrodes on the substrate. In some implementations, the sacrificial layer 807 can be patterned to create corrugations in the resonator which will be deposited in Step 808. An example of a device having such a corrugated resonator is shown in FIG. 8H.

The method 800 includes the step of depositing a resonator layer (Step 808). The resonator layer can be formed from a conductive material such as conductive doped silicon carbide or conductive doped diamond. In some implementations, the resonator layer is deposited by a chemical vapor deposition process. Deposition of the resonator layer fills in the gap in the center of the bottom of the cavity left by the patterning of the sacrificial layer, in order to create the stem of the resonator. In some implementations, the resonator layer can have a thickness in the range of about 0.05 microns to about 20 microns.

The method 800 includes the step of patterning the resonator layer (Step 811). As shown in FIG. 8E, material from the resonator layer 809 can be removed to form a separate resonator 810, as well as electrodes 815a and 815b. As discussed above, the resonator 810 and the electrodes 815a and 815b can be aligned to a high degree of precision because they are formed from the same material during a single step of the method 800 (i.e., Step 808). The resonator layer 809 can be patterned so that the resonator 810 includes a lip 840 elevated above the surface of the substrate 805. In some implementations, the lip 840 can be segmented into tabs. The number of tabs can be a multiple of eight. At Step 811 of the method 800, the resonator 810 and lip 840 are also positioned above the sacrificial layer 807, which can be removed in a later step of the method 800. An etch mask not shown in FIG. 8E can be applied to the resonator layer prior to patterning. In some implementations, the etch mask is made from silicon dioxide, chromium, or aluminum that is applied by evaporation, sputtering, chemical vapor deposition or plasma-enhanced chemical vapor deposition process. The mask can then be patterned by a plasma etching or wet etching process, and the resonator layer 809 can be etched using oxygen plasma with a small percentage of gas containing fluorine, such as sulfur hexafluoride or carbon tetrafluoride.

The method 800 includes the step of depositing metal bond pads (Step 812). Bond pads can be formed from a metal or other electrically conductive material, such as copper or gold, deposited onto the electrodes 815a and 815b. A lift off process in which a stencil layer is applied, the bond pad material is deposited, and the stencil is then washed away, can be used to create the bond pads. FIG. 8F shows bond pads 816a and 816b deposited onto the electrodes 815a and 815b, respectively. The bond pads 816a and 816b can then be used to connect to other electrical circuitry (e.g., to monitor outputs from the electrodes 815a and 815b). Bond pads 816c and 816c are also shown on the lip 840 of the resonator 810. the substrate 805, sacrificial layer 807, resonator 810, and conductor layer 817 are also shown.

The method 800 also includes the step of removing the sacrificial layer (Step 814). The sacrificial layer can be removed in this step, creating a gap between the resonator and the conductor layer on the wall of the hemispherical cavity in the substrate, which allows the resonator to vibrate freely. An etching process using xenon diflouride or tetra-methyl ammonium hydroxide can be used to remove the sacrificial layer. Unlike Step 714 of the method 700, removing the sacrificial layer in Step 814 of method 800 does not require timed patterning, because there is no need to leave a portion of the sacrificial layer intact. This is because the stem of the resonator in the method 800 is formed by the resonator layer itself, rather than by material from the sacrificial layer. FIG. 8G shows the device 801 in its final configuration with the sacrificial layer completely removed from the sides of the hemispherical cavity.

FIG. 8H depicts an alternative implementation for a device 842 that can be built using the steps of the method 800. The device 842 of FIG. 8H is identical to the device 801 of FIG. 8G, except that the resonator 810 of the device 842 includes a corrugated region 844. For example, the corrugated region 844 can be achieved by patterning concentric circular channels into the sacrificial layer in Step 806. When the resonator 810 is deposited onto the patterned sacrificial layer, the resonator 810 will coat the walls of the channels patterned in the sacrificial layer, creating the corrugated region 844.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A MEMS gyroscope comprising:
   a substrate comprising an amorphous material having a substantially planar surface, a substantially hemispherical cavity extending into the surface of the amorphous material substrate, an actuation electrode, and a plurality of sensing electrodes;
   a resonator including a substantially hemispherical shell suspended within the cavity by a stem coupling the center of the bottom of the cavity to the center of the bottom of the shell; and
   an electronic processor configured to:
   cause a voltage to be applied to the actuation electrode;
   receive signals from the sensing electrodes; and
   process the received signals to determine rotation of the MEMS gyroscope.

2. The MEMS gyroscope of claim 1, wherein the resonator comprises a lip extending radially outwards around an edge of the hemispherical shell.

3. The MEMS gyroscope of claim 2, wherein the resonator comprises an electrically conductive material.

4. The MEMS gyroscope of claim 3, wherein the electrically conductive material comprises one of boron doped diamond, doped silicon carbide, and doped silicon.

5. The MEMS gyroscope of claim 3, wherein the actuation and sensing electrodes are positioned on the surface of the substrate beneath the resonator.

6. The MEMS gyroscope of claim 5, wherein the actuation and sensing electrodes are positioned such that a first portion of each electrode is located on the surface of the substrate beneath the lip of the resonator and a second portion of each electrode extends downward on the surface of the hemispherical cavity.

7. The MEMS gyroscope of claim 3, wherein the actuation and sensing electrodes are positioned on the top surface of the substrate surrounding the lip of the resonator.

8. The MEMS gyroscope of claim 2, wherein the actuation electrodes comprise interdigitated electrode pairs located on the surface of the substrate beneath the lip of the resonator such that a voltage applied to the electrodes creates fringing fields that cause the resonator to vibrate.

9. The MEMS gyroscope of claim 2, wherein the lip of the resonator is segmented into tabs extending radially outward from the edge of the resonator.

10. The MEMS gyroscope of claim 9, wherein the total number of tabs is a multiple of eight.

11. The MEMS gyroscope of claim 9, further comprising a metal deposited onto the tabs, wherein a mass of the metal differs on at least two of the tabs.

12. The MEMS gyroscope of claim 11, wherein the metal comprises an adhesion layer of chromium, zirconium or titanium and at least one of gold and copper.

13. The MEMS gyroscope of claim 11, wherein the resonator has a first resonant frequency associated with a first vibratory mode and a second resonant frequency associated with a second vibratory mode, and wherein the mass of metal on each tab is selected to increase a degree of matching between the first resonant frequency and the second resonant frequency.

14. The MEMS gyroscope of claim 1, wherein the actuation and sensing electrodes surround the hemispherical cavity and the number of electrodes is a multiple of eight.

15. The MEMS gyroscope of claim 1, wherein the actuation and sensing electrodes are made from a silicide comprising at least one of chromium, zirconium, platinum, palladium, nickel, cobalt, iron, iridium, rhodium, and ruthenium.

16. The MEMS gyroscope of claim 1, wherein the actuation and sensing electrodes comprise dual metal stacks made from chromium or zirconium and at least one of platinum, palladium, nickel, cobalt, iron, iridium, rhodium, zirconium, vanadium, hafnium and ruthenium.

17. The MEMS gyroscope of claim 1, wherein the resonator is made from a dielectric material.

18. The MEMS gyroscope of claim 17, wherein the dielectric material is one of diamond, $SiO_2$, $Si_3N_4$, and $SiO_2$—$TiO_2$.

19. The MEMS gyroscope of claim 1, wherein the amorphous material is selected such that the coefficient of thermal expansion of the substrate matches the coefficient of thermal expansion of the resonator.

20. The MEMS gyroscope of claim 1, wherein the amorphous material comprises CORNING 1715 glass.

21. The MEMS gyroscope of claim 1, wherein the coefficients of thermal expansion of the resonator and the substrate are both in the range of about 2 to about 4 parts per million per degree Celsius.

22. The MEMS gyroscope of claim 1, wherein the stem extends into the substrate below the bottom of the cavity.

23. The MEMS gyroscope of claim 1, further comprising a thin film battery located on the substrate and coupled to the electronic processor.

24. The MEMS gyroscope of claim 1, further comprising at least one resistor located between at least one of the electrodes and an electrical or virtual ground or a drive circuit.

25. The MEMS gyroscope of claim 24, wherein the resonator has a first Q value associated with a first vibratory mode and a second Q value associated with a second vibratory mode, and wherein a value of the at least one resistor is selected to increase a degree of matching between the first Q value and the second Q value.

26. The MEMS gyroscope of claim 1, wherein the stem is hollow.

27. The MEMS gyroscope of claim 1, wherein the resonator includes a corrugated region at its center.

28. The MEMS gyroscope of claim 1, wherein the resonator has a thickness in the range of about 0.5 microns to about 20 microns.

29. The MEMS gyroscope of claim 1, wherein the resonator has a diameter in the range of about 0.2 mm to about 10 mm.

* * * * *